United States Patent
Hu

(10) Patent No.: US 8,376,915 B2
(45) Date of Patent: Feb. 19, 2013

(54) EXERCISE BICYCLE

(75) Inventor: Liqun Hu, Dalian (CN)

(73) Assignees: Liqun Hu, Dalian, Liaoning (CN);
Jiaxiang Zhang, Shenzhen (CN)

( * ) Notice: Subject to any disclaimer, the term of this patent is extended or adjusted under 35 U.S.C. 154(b) by 344 days.

(21) Appl. No.: 12/597,900

(22) PCT Filed: Apr. 23, 2008

(86) PCT No.: PCT/CN2008/070778
§ 371 (c)(1),
(2), (4) Date: Dec. 15, 2009

(87) PCT Pub. No.: WO2008/131679
PCT Pub. Date: Nov. 6, 2008

(65) Prior Publication Data
US 2010/0130331 A1    May 27, 2010

(30) Foreign Application Priority Data
Apr. 28, 2007    (CN) .................... 2007 2 0119818 U

(51) Int. Cl.
A63B 22/08    (2006.01)
A63B 69/16    (2006.01)
A63B 23/04    (2006.01)

(52) U.S. Cl. ................. 482/57; 482/51; 482/72; 482/95

(58) Field of Classification Search .................... 482/57, 482/62, 72, 95, 96, 51; 472/95, 108, 135; 74/594.4, 594.5, 594.6, 594.7; 280/221, 280/226.1, 227
See application file for complete search history.

(56) References Cited

U.S. PATENT DOCUMENTS

| | | | | |
|---|---|---|---|---|
| 1,510,316 A | * | 9/1924 | Gentry | 472/96 |
| 1,730,557 A | * | 10/1929 | Brackett | 472/96 |
| 2,675,234 A | * | 4/1954 | Reames | 472/95 |
| 3,068,000 A | * | 12/1962 | Hanson | 472/96 |
| 4,732,404 A | * | 3/1988 | Coetzee | 280/283 |
| 4,915,376 A | * | 4/1990 | St. Clair | 482/57 |

(Continued)

FOREIGN PATENT DOCUMENTS

| CN | 2244417 Y | 1/1997 |
|---|---|---|
| CN | 2394837 Y | 9/2000 |

(Continued)

OTHER PUBLICATIONS

Office Action issued for corresponding Japanese patent application 2010-504428, dated Aug. 27, 2012 (5 pages).

*Primary Examiner* — Loan Thanh
*Assistant Examiner* — Victor K Hwang
(74) *Attorney, Agent, or Firm* — Hamre, Schumann, Mueller & Larson, P.C.

(57) ABSTRACT

An exercise bicycle is provided with a planar four bar linkage with cranks. The bicycle frame (5) is used as the machine frame of the planar four bar linkage, the seat (2) of the bicycle is fixed on a connecting rod (8) of the planar four bar linkage, and the connecting rod (8) is not directly connected with the bicycle frame (5). A middle axle (10) is used as the crank shaft, and one end of the connecting rod (8) is rotationally connected with a crank pin journal of the crank shaft (10), the other end thereof is connected with the member of the bicycle frame (5). The seat of the bicycle can do periodic movement with translation and rotation while a person rides the bicycle.

20 Claims, 13 Drawing Sheets

U.S. PATENT DOCUMENTS

| | | | |
|---|---|---|---|
| 5,145,477 A * | 9/1992 | Han | 482/57 |
| 5,643,145 A | 7/1997 | Lo et al. | |
| 5,904,636 A * | 5/1999 | Chen | 482/51 |
| 6,474,193 B1 | 11/2002 | Farney | |
| 6,499,747 B2 * | 12/2002 | Fagan | 280/1.207 |
| 6,793,609 B1 | 9/2004 | Fan | |
| 7,427,256 B2 * | 9/2008 | Fan | 482/64 |
| 7,824,274 B2 * | 11/2010 | Chuang et al. | 472/96 |
| 7,828,666 B2 * | 11/2010 | Chuang et al. | 472/96 |
| 7,867,146 B2 * | 1/2011 | Ge et al. | 482/51 |
| 2007/0049467 A1 | 3/2007 | Lin | |
| 2007/0099767 A1* | 5/2007 | Harashima | 482/57 |
| 2008/0171606 A1* | 7/2008 | Chuang et al. | 472/97 |
| 2008/0220946 A1* | 9/2008 | Chang | 482/57 |

FOREIGN PATENT DOCUMENTS

| | | |
|---|---|---|
| CN | 2502738 Y | 7/2002 |
| CN | 2678712 Y | 2/2005 |
| CN | 2829799 Y | 10/2006 |
| CN | 201033611 Y | 3/2008 |
| JP | 1969-027707 | 11/1969 |
| JP | 7-213645 A | 8/1995 |
| JP | 2002-345992 | 12/2002 |
| JP | 3099215 | 11/2003 |
| JP | 3119183 | 1/2006 |
| TW | 200822945 A * | 6/2008 |
| TW | 200822946 A * | 6/2008 |

* cited by examiner

EXERCISE BICYCLE

TECHNICAL FIELD

This utility model relates to an exercise bicycle.

BACKGROUND ART

In the prior art, an exercise bicycle comprises a bicycle frame, a seat arranged above the middle part of the bicycle frame, a handle bar arranged above the front part of the bicycle frame, and pedals for feet to pedal. At present, the exercise bicycle is mainly used for body-building, with a lack in amusement function and demand to further strengthen the body-building effect.

SUMMARY OF THE INVENTION

The purpose of the utility model is to provide an exercise bicycle, the seat of which can do periodic combined movement with translation and rotation while a person rides the bicycle.

To achieve the above purpose, the utility model has the basic conception as follows: an exercise bicycle comprises a bicycle frame, a seat arranged above the middle part of the bicycle frame, a handle bar arranged above the front part of the bicycle frame, and a pedal mechanism, wherein a planar four bar linkage with cranks is assembled on the bicycle frame which is used as a machine frame of the planar four bar linkage; the seat is fixed on a connecting rod of the planar four bar linkage, and the connecting rod is not directly connected with the bicycle frame; the cranks are realized by the cranks of a crank shaft on the bicycle frame; one end of the connecting rod which is not directly connected with the bicycle frame is rotationally connected with a crank pin journal of the crank shaft, the other end thereof is connected with a member connected to the bicycle frame; the crank shaft is connected with the pedal mechanism.

There are six technical solutions for realizing the basic conception of the utility model.

The First Solution

An exercise bicycle comprises a bicycle frame, a seat arranged above the middle part of the bicycle frame, a handle bar arranged above the front part of the bicycle frame, a middle axle arranged below the middle part of the bicycle frame, a pair of pedal cranks respectively fixedly connected to two ends of the middle axle, and two pedals respectively connected to the pair of pedal cranks, wherein the middle axle is a crank shaft; a connecting rod and a rocker are provided, one end of the connecting rod is rotationally connected with a crank pin journal of the middle axle, the other end of the connecting rod is articulated with one end of the rocker, the other end of the rocker is articulated to the bicycle frame; the middle axle, the connecting rod, the rocker and the bicycle frame make up a crank-rocker mechanism; the is position of the seat is fixed relatively to that of the connecting rod.

The Second Solution

An exercise bicycle comprises a bicycle frame, a seat arranged above the middle part of the bicycle frame, a handle bar arranged above the front part of the bicycle frame, a middle axle arranged below the middle part of the bicycle frame, a pair of pedal cranks respectively fixedly connected to two ends of the middle axle, and two pedals respectively connected to the pair of pedal cranks, wherein the middle axle is formed by arranging an eccentric wheel on a straight shaft, the eccentric wheel is fixedly connected with the straight shaft; a connecting rod and a rocker are provided, the eccentric wheel is rotationally connected with one end of the connecting rod, the other end of the connecting rod is articulated with one end of the rocker, the other end of the rocker is articulated to the bicycle frame, the kinetic characteristic of the mechanism made up of the middle axle, the connecting rod, the rocker and the bicycle frame is in accordance with that of the crank-rocker mechanism; the position of the seat is fixed relative to that of the connecting rod.

The Third Solution

An exercise bicycle comprises a bicycle frame, a seat arranged above the middle part of the bicycle frame, a handle bar arranged above the front part of the bicycle frame, a middle axle arranged below the middle part of the bicycle frame, a pair of pedal cranks respectively fixedly connected to two ends of the middle axle, and two pedals respectively connected to the pair of pedal cranks, wherein the middle axle is a crank shaft; a connecting rod is provided, one end of the connecting rod is rotationally connected with a crank pin journal of the middle axle, the other end of the connecting rod is articulated with a slider which is in slip connection with a slider groove fixedly connected to the bicycle frame; the middle axle, the connecting rod, the slider, the slider groove and the bicycle frame make up a crank-slider mechanism; the position of the seat is fixed relatively to that of the connecting rod.

The Fourth Solution

An exercise bicycle comprises a bicycle frame, a seat arranged above the middle part of the bicycle frame, a handle bar arranged above the front part of the bicycle frame, a middle axle arranged below the middle part of the bicycle frame, a pair of pedal cranks respectively fixedly connected to two ends of the middle axle, and two pedals respectively connected to the pair of pedal cranks, wherein the middle axle is formed by arranging an eccentric wheel on a straight shaft, the eccentric wheel is fixedly connected with the straight shaft; a connecting rod is provided, the eccentric wheel is rotationally connected with one end of the connecting rod, the other end of the connecting rod is articulated with a slider which is in slip connection with a slider groove arranged on the bicycle frame, the kinetic characteristic of the mechanism made up of the middle axle, the connecting rod, the slider, the slider groove and the bicycle frame is in accordance with that of the crank-slider mechanism; the position of the seat is fixed relatively to that of the connecting rod.

The Fifth Solution

An exercise bicycle comprises a bicycle frame, a seat arranged above the middle part of the bicycle frame, a handle bar arranged above the front part of the bicycle frame, a middle axle arranged below the middle part of the bicycle frame, a pair of pedal cranks respectively fixedly connected to two ends of the middle axle, and two pedals respectively connected to the pair of pedal cranks, wherein the middle axle is a crank shaft; a guide rod is provided, one end of the guide rod is rotationally connected with a crank pin journal of the middle axle, the other end of the guide rod is in slip connection with a swing block articulated to the bicycle frame; the middle axle, the guide rod, the swing block and the bicycle frame make up a crank-swing block mechanism; the position of the seat is fixed relatively to that of the guide rod.

The Sixth Solution

An exercise bicycle comprises a bicycle frame, a seat arranged above the middle part of the bicycle frame, a handle bar arranged above the front part of the bicycle frame, a middle axle arranged below the middle part of the bicycle frame, a pair of pedal cranks respectively fixedly connected to two ends of the middle axle, and two pedals respectively connected to the pair of pedal cranks, wherein the middle axle is formed by arranging an eccentric wheel on a straight shaft, the eccentric wheel is fixedly connected with the straight shaft; a guide rod is provided, the eccentric wheel is rotationally connected with one end of the guide rod, the other end of the guide rod is in slip connection with a swing block articulated to the bicycle frame; the kinetic characteristic of the mechanism made up of the middle axle, the guide rod, the swing block and the bicycle frame is in accordance with that of the crank-swing block mechanism; the position of the seat is fixed relatively to that of the guide rod.

The planar bar linkage assembled in the first solution and the second solution is a crank-rocker mechanism; the planar bar linkage assembled in the third solution and the fourth solution is a crank-slider mechanism; and the planar bar linkage assembled in the fifth solution and the sixth solution is a crank-swing block mechanism. In the crank-rocker mechanism, the crank-slider mechanism or the crank-swing block mechanism, when the cranks do circular movement, the connecting rod or the guide rod in the corresponding mechanism do periodic combined movement with translation and rotation. In the first solution to the sixth solution, the position of the seat is fixed relatively to that of the connecting rod or the guide rod. In this way, the seat does periodic combined movement with translation and rotation while a person rides the bicycle. A wealth of sense of movement is generated when a person sits on the seat to ride the exercise bicycle, which strengthens entertainment during the riding. The seat can do movement with translation and rotation while a person rides the bicycle; therefore, the amount of muscle in motion of a person will increase, and the effect of physical training is strengthened.

As an improvement, in any one of the first solution to the sixth solution, one end of the pedal crank is fixedly connected with the middle axle, the circumferential fixed structure of the pedal crank on the middle axle is a structure in which the circumferential constant angle of the pedal crank on the middle axle can be changed, the circumferential fixed structure has at least one fixed state so as to ensure that the angle between the pair of pedal cranks is 180 degrees, that is, the two pedal cranks are in parallel distributed at the two sides of the middle axle; moreover, the circumferential fixed structure has at least one fixed state so as to ensure that the angle between the pair of pedal cranks is zero and the angle between the pair of pedal cranks and the crank of the middle axle or the crank equivalent to the eccentric wheel is 180 degrees, that is, the two pedal cranks are in parallel located at the same side of the middle axle, and the two pedal cranks and the crank of the middle axle or the crank equivalent to the eccentric wheel are in parallel distributed at the two sides of the middle axle. The structure that the above pedal cranks are fixedly connected with the middle axle can adopt the following solution to match the characteristics of the circumferential fixed structure on the middle axle: the axle head of the middle axle is a cylinder with a cross section in regular polygon with even number of sides, the end portion of each pedal crank is provided with a polygonal groove matching with the axle head being a cylinder with a cross section in regular polygon, the grooves are arranged on the two pedal cranks at the same position, the axle head having a cross section in regular polygon is inserted into the corresponding groove on the pedal crank and is fixed by a fastening mechanism; moreover, when the angle between any one of the pedal cranks and the crank of the middle axle or the crank equivalent to the eccentric wheel is 180 degrees, the axle head can be just aligned with the groove, that is the axle head can be inserted into the groove. By the above improvement, the two pedal cranks can be fixed at different angles, and the pedal cranks and the crank of the middle axle or the crank equivalent to the eccentric wheel can also be fixed at different angles. The force required in riding varies with the angle. In this way, more ways of exerting strength in riding can be selected, thereby increasing entertainment and guaranteeing diversity in body-building effect.

As an improvement in the above first, third and fifth solutions, the above middle axle is provided with a mechanism for regulating the effective length of the crank of the middle axle. The middle axle has two operational states: one is that the effective length of the crank of the middle axle is zero and the other one is the effective length of the crank of the middle axle is not zero. When the effective length of the crank of the middle axle is not zero, the middle axle can work at least two different effective lengths of the crank of the middle axle. When the effective length of the crank of the middle axle is zero, the position of the connecting rod is fixed relatively to that of the bicycle frame, while the position of the seat is fixed relatively to that of the connecting rod. In this way, the position of the seat is fixed relatively to that of the bicycle frame, and the bicycle can be used as an ordinary exercise bicycle. When the effective length of the crank of the middle axle is not zero, the middle axle works at different effective lengths of the crank of the middle axle, the connecting rod connected to the crank of the middle axle has different motion amplitudes in operation, while the position of the seat is fixed relatively to that of the connecting rod. In this way, the amplitude of periodic motion of the seat can be regulated; while the applied moment between the middle axle and the connecting rod varies with the effective length of the crank of the middle axle, thus the magnitude of the exerted force while a person rides the bicycle can be regulated.

As an improvement of the above second, fourth and sixth solutions, the middle axle is provided with a mechanism for regulating an offset distance of the eccentric wheel. The middle axle has two operational states: one is that the offset distance is zero and the other one is that the offset distance is not zero. When the offset distance is zero, the middle axle can work at least two offset distances with different lengths. When the offset distance is zero, the position of the connecting rod or the guide rod is fixed relatively to that of the bicycle frame, while the position of the seat is fixed relatively to that of the connecting rod or the guide rod. In this way, the position of the seat is fixed relatively to that of the bicycle frame, and the bicycle can be used as an ordinary exercise bicycle. When the offset distance of the eccentric wheel is not zero, the middle axle works at offset distances with different lengths, the connecting rod or the guide rod connected to the eccentric wheel has different motion amplitudes in operation, while the position of the seat is fixed relatively to that of the connecting rod or the guide rod. In this way, the amplitude of periodic motion of the seat can be regulated; while the applied moment between the middle axle and the connecting rod or the guide rod varies with the length of the offset distance of the eccentric wheel, thus the magnitude of the exerted force can be regulated while a person rides the bicycle.

As an improvement of the pedal stated in any one of the first solution to the sixth solution, the pedal is improved to be not only pedaled by sole but also pulled by instep. To this end, the basic conception is as follows. Each pedal comprises a sole part, an instep part, a supporting frame and a pedal shaft, wherein the supporting frame comprises an upper end and a lower end; one end of the sole part is connected with the lower end of the supporting frame; one end of the instep part is connected with the upper end of the supporting frame; the instep part and the sole part are positioned at the same side of the supporting frame; one end of the pedal shaft is connected to the supporting frame at the position between the sole part and the instep part, the pedal shaft is positioned on the supporting frame at the opposite side to the sole part and the instep part; in the state that the sole part is under the instep part, the axis of the pedal shaft is positioned above the center of gravity of the mechanism formed by the connection of the supporting frame, the instep part and the sole part; the instep part has a length in the direction of the axis of the pedal shaft less than the length of the sole part in the direction of the axis of the pedal shaft.

There are two technical solutions for realizing the improved conceptions of pedals.

Pedal Solution A

A pedal of a bicycle comprises a sole part, an instep part, a supporting frame and a pedal shaft, wherein the supporting frame comprises an upper end and a lower end; one end of the sole part is fixedly or rotationally connected with the lower end of the supporting frame; one end of the instep part is fixedly or rotationally connected with the upper end of the supporting frame; the instep part and the sole part are positioned at the same side of the supporting frame; one end of the pedal shaft is rotationally connected to the supporting frame at the position between the sole part and the instep part, the pedal shaft is positioned on the supporting frame at the opposite side to the sole part and the instep part; in the state that the sole part is under the instep part, the axis of the pedal shaft is positioned above the center of gravity of the mechanism formed by the connection of the supporting frame, the instep part and the sole part; the instep part has a length in the direction of the axis of the pedal shaft less than the length of the sole part in the direction of the axis of the pedal shaft.

Pedal Solution B

A foot pedal of a bicycle comprises a sole part, an instep part, a supporting frame and a pedal shaft, wherein the supporting frame comprises an upper end and a lower end; one end of the sole part is fixedly or rotationally connected with the lower end of the supporting frame; one end of the instep part is fixedly or rotationally connected with the upper end of the supporting frame; the instep part and the sole part are positioned at the same side of the supporting frame; one end of the pedal shaft is fixed connected to the supporting frame at the position between the sole part and the instep part, the other end of the pedal shaft is rotationally connected with the pedal crank, the pedal shaft is positioned on the supporting frame at the opposite side to the sole part and the instep part; in the state that the sole part is under the instep part, the axis of the pedal shaft is positioned above the center of gravity of the mechanism formed by the connection of the supporting frame, the sole part and the instep part; the instep part has a length in the direction of the axis of the pedal shaft less than the length of the sole part in the direction of the axis of the pedal shaft.

The adoption of the pedal solution A or B ensures that the present utility model has the following advantages compared with the prior art. Because each pedal comprises a sole part, an instep part and a supporting frame, foot can pedal between the two, the sole part is positioned under foot, the instep part is positioned on instep, and the supporting frame is positioned at the inner side of foot; in this way, the pedal can be not only pedaled by sole but also pulled by instep; because in the state that the sole part is under the instep part, the axis of the pedal shaft is positioned above the center of gravity of the mechanism formed by the connection of the supporting frame, the pedal itself can maintain such a stably balanced state that the sole part is under the instep part, thereby bringing about convenience in use; when each foot is positioned between the sole part and the instep part, the sole part is positioned under foot, the instep part is positioned on instep and the supporting frame is positioned at the inner side of the foot, the length blocking the instep is short and the foot can come out from the pedal conveniently because the instep part has a length in the direction of the axis of the pedal shaft less than the length of the sole part in the direction of the axis of the pedal shaft.

As an improvement of the above pedal solution A or B, when one end of the instep part is fixedly connected with the upper end of the supporting frame, the fixed connection mechanism can regulate the angle of the instep part fixedly connected to the supporting frame. The force exerted by the instep can be applied to the supporting frame through the instep part, and to the pedal shaft through the supporting frame, thereby regulating the angle of the instep part fixedly connected to the supporting frame and regulating the effect of exerting a force by the instep; because the sole part in operation is positioned under foot, the instep part is positioned on instep and the supporting frame is positioned at the inner side of the foot, the angle of the instep part fixedly connected to the supporting frame can be regulated to be adapted to the instep with different heights, and the position of the contact surface of the instep and the instep part on the instep can also be regulated.

As an improvement of the pedal solution A or B, when one end of the sole part is fixedly connected with the lower end of the supporting frame, the fixed connection mechanism can regulate the angle of the sole part fixedly connected to the supporting frame. The force exerted by the sole can be applied to the supporting frame through the sole part, and to the pedal shaft through supporting frame, thereby regulating the angle of the sole part fixedly connected to the supporting frame and regulating the effect of exerting force by the sole; because the sole part in work is positioned under foot, the instep part is positioned on instep and the supporting frame is positioned at the inner side of the foot, the angle of the sole part fixedly connected to the supporting frame can be regulated to be adapted to the instep with different heights, and the position of the contact surface of the sole and the sole part under the sole can also be regulated.

As an improvement of the above pedal solution A or B, or a further improvement of the above improved pedal solutions, the supporting frame is provided with a mechanism for regulating the distance between the connection position of the instep part on the supporting frame and the connection position of the sole part on the supporting frame. Because the sole part in operation is positioned under foot, the instep part is positioned on instep and the supporting frame is positioned at the inner side of the foot, the regulation of the distance between the connection position of the instep part on the supporting frame and the connection position of the sole part on the supporting frame ensures that the height for holding the foot between the instep part and the sole part can be regulated to be adapted to feet with different heights of the instep.

As an improvement of any one solution of the exercise bicycle, the exercise bicycle is combined with an animal model so that the person riding the bicycle can feel the effect of riding the animal to strengthen the entertainment function of the exercise bicycle. To this end, the adopted technical solution is that: the position of the animal model with a continuous appearance is fixed relatively to that of the connecting rod or the guide rod, the animal model can do synchronized motion with the connecting rod or the guide rod, the back of the animal model is positioned above the middle part of the bicycle frame, and the riding function of the seat is realized by the back of the animal model.

The adoption of the technical solution that the bicycle is combined with the animal model ensures that the utility model has the following advantages compared with the prior art. The animal model provides an animal image, the appearance of which is continuous in structure instead of a plurality of disconnected parts, and thus the animal image provided by the animal model is relatively lifelike. The riding function of the seat realized by the back of the animal model ensures that the effect of riding an animal is achieved when the person rides the bicycle. The animal model itself does not have the motion function, which will be provided by the exercise bicycle. The thickness of the animal model is subject to unblocking the action of feet to pedal to and fro while a person rides the bicycle. Such a combined structure will not block the implementation of the motion function of the exercise bicycle. In this way, the exercise bicycle has the effect of riding an animal after combined with the animal model while a person rides the bicycle, thereby strengthening the entertainment function of the exercise bicycle.

As an improvement of any one solution of the exercise bicycle, the handle bar is connected to the connecting bar or the guide rod. In this way, the person will do relative movement all over the body to the bicycle frame while riding the bicycle, thereby increasing enjoyment. In the technical solution with the animal model, it can be ensured that the handle bar does relative movement of rotation instead of translation to the animal model, thereby avoiding relative sliding between the handle bar and the animal model and overcoming the defects such as complicated model manufacture due to relative sliding.

1. handle bar; 2. seat; 5. bicycle frame; 6. pedal; 7. rocker; 8. connecting rod; 9. seat supporting stand; 10. middle axle; 11. pedal crank; 12. crank pin journal; 13. journal hole; 14. bushing; 15. bolt; 16. bolt; 17. bolt; 18. bolt; 19. crank of the middle axle;

20. crank of the middle axle; 21. fixing hole; 22. fixing hole; 23. fixing hole; 24. fixing hole; 25. fixing hole; 26. fixing hole; 27. main journal of the middle axle; 28. main journal of the middle axle; 29. axle head of the middle axle; 30. axle head of the middle axle; 31. nut; 32. nut; 33 fixing hole; 34. fixing hole; 35. recess in regular octagon; 36. pedal crank; 37. pedal; 38. bearing cover; 39. bearing cover; 40. bearing support; 41. bearing support; 42. straight shaft; 43. fixing hole; 44. fixing hole; 45. fixing hole; 46. fixing hole; 47. fixing hole; 48. fixing hole; 49. fixing hole; 50. fixing hole; 51. bracket of the straight shaft; 52. eccentric wheel; 53. bolt; 54. bolt; 55. nut; 56. nut; 57. groove; 58. eccentric wheel support; 59. eccentric wheel cover; 60. slider groove; 61. slider; 62. articulating handle; 63. elongated opening; 64. swing block; 65. guide rod;

66. horse model; 67. cushion; 68-75. bolt hole; 76. fixing groove; 101. sole part; 102. instep part; 103. supporting frame; 104. pedal shaft; 105. fixing shank; 106. fixing hole; 107. sole member of the supporting frame; 108. instep member of the supporting frame; 109. guide groove; 110. elongated straight side; 111. through hole; 112. location pin; 113. location hole; 114. pivot shaft; 115. pivot shaft hole; 116. bushing; 117. pedal shaft hole; 118. spring; 119. shaft collar; 120. shaft collar groove; 121. fixing hole; 122. location pin; 123. location hole; 124. fixing shank; 125. pivot shaft hole; 126. pivot shaft; 127. bushing; 128. guide groove; 129. elongated straight side.

DESCRIPTION OF SPECIFIC EMBODIMENTS

The First Embodiment

Figure 1:
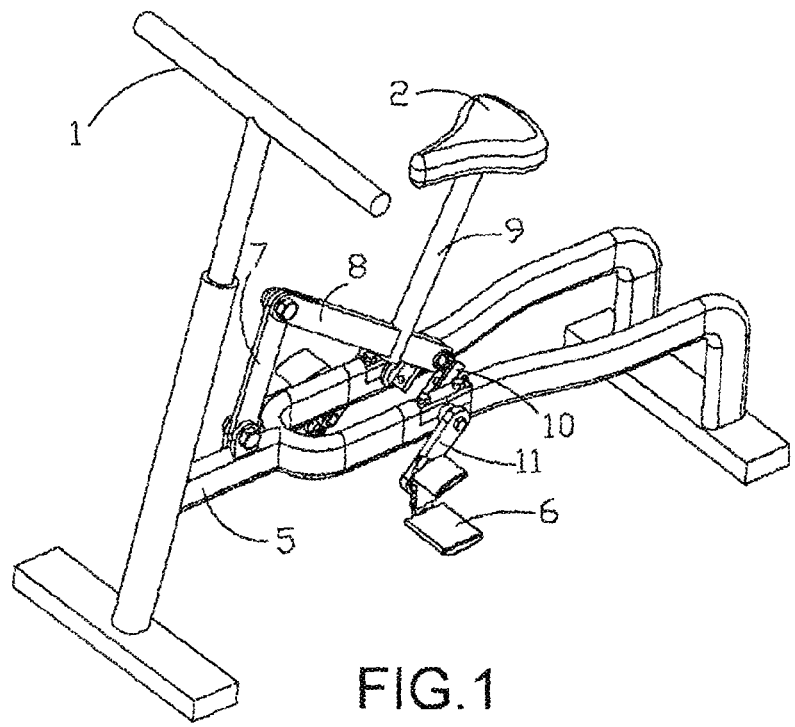
FIG. 1 is a perspective view of an exercise bicycle in which a crank-rocker mechanism is arranged on a bicycle frame and a middle axle is a crank shaft.

Referring to each drawing, the first embodiment is an embodiment corresponding to the first solution of the summary of the invention and its improvement. FIG. 1 is a perspective view of this embodiment. An exercise bicycle comprises a bicycle frame 5, a seat 2 arranged above the middle part of the bicycle frame 5, a handle bar 1 arranged above the front part of the bicycle frame 5, a middle axle 10 arranged below the middle part of the bicycle frame, a pair of pedal cranks 11, 36 respectively fixedly connected to two ends of the middle axle 10, and two pedals 6, 37 respectively connected to the pair of pedal cranks, wherein the middle axle 10 is a crank shaft; a connecting rod 8 and a rocker 7 are provided, one end of the connecting rod 8 is rotationally connected with the crank pin journal 12 of the middle axle 10, the other end of the connecting rod is articulated with one end of the rocker 7, the other end of the rocker 7 is articulated to the bicycle frame 5; the middle axle 10, the connecting rod 8, the rocker 7 and the bicycle frame 5 make up a crank-rocker mechanism; the position of the seat 2 is fixed relatively to that of the connecting rod 8, and the seat 2 is fixedly connected to the connecting rod 8 through the seat supporting stand 9.

Figure 2:
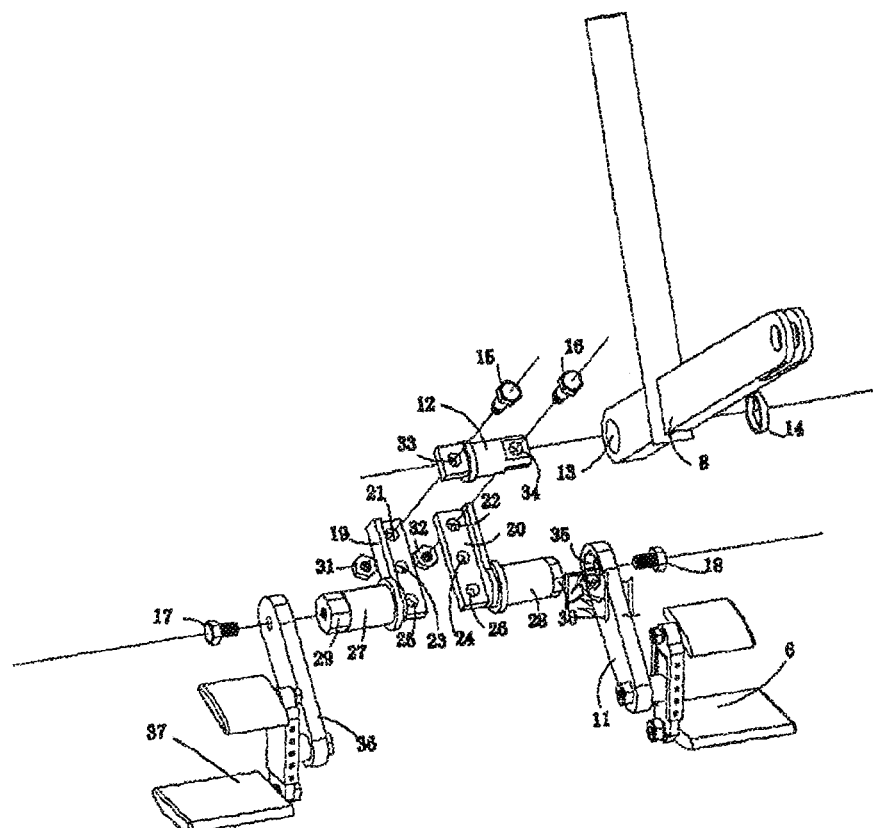
FIG. 2, illustrating the structure of the crank shaft, is an assembly drawing.

The middle axle 10 is the crank shaft, and its implementation is shown in FIG. 2. The corresponding crank 19 of the middle axle and the crank 20 of the middle axle are arranged on the middle axle 10; the crank 19 of the middle axle is provided with fixing holes 21, 23, 25 for fixing the crank pin journal 12, the crank 20 of the middle axle is provided with fixing holes 22, 24, 26 for fixing the crank pin journal 12; the crank pin journal 12 is respectively provided with fixing holes 33, 34 at the two ends for being fixedly connected with the cranks of the middle axle. In the assembling process, firstly, the crank pin journal 12 passes through the journal hole 13 on the connecting rod 8, and is sleeved with a bushing 14; secondly, the bolt 15 passes through the fixing hole 33 and the fixing hole 21 on the crank of the middle axle, and is screwed down and fixed by the nut 31, the bolt 16 at the other side passes through the fixing hole 34 and the fixing hole 22 on the crank of the middle axle, and is screwed down and fixed by the nut 32. In the above assembling process, the crank pin journal 12 is fixed by the fixing holes 21, 22 on the cranks of the middle axle. In such an assembly mode, the middle axle 10 is the crank shaft. It is acceptable that the crank pin journal 12 is fixed by the fixing holes 23, 24 on the cranks of the middle axle; in such an assembling mode, the middle axle 10 is also the crank shaft, but the effective length of the crank in operation is relatively short. It is also acceptable that the crank pin journal 12 is fixed by the fixing holes 25, 26 on the cranks of the middle axle; in such an assembling mode, the crank pin journal 12 and the axes 27, 28 of the main journals 27, 28 of the middle axle are on the same line, the effective working length of the crank of the middle axle is zero, and the middle axle 10 corresponds to the straight shaft.

Figure 3:
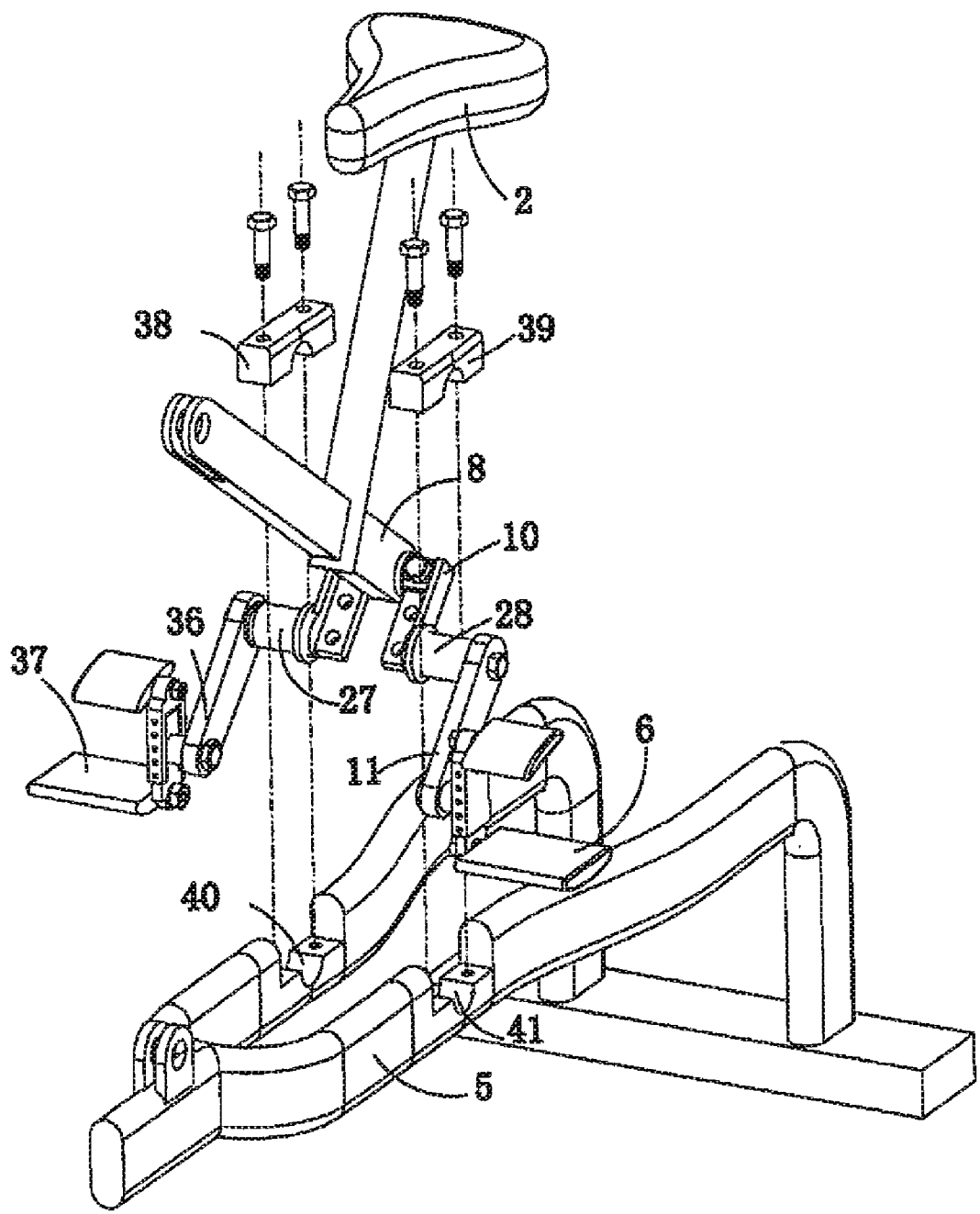
FIG. 3, illustrating the assembled crank shaft, is a drawing of assembling the crank shaft on the bicycle frame.

As shown in FIGS. 2, 3, the axle heads 29, 30 at the two ends of the middle axle 10 are cylinders with cross sections in regular octagon, the end portion of the pedal crank 11 is provided with a recess 35 in regular octagon matching with the axle head 30 being a cylinder with a cross section in regular octagon, and the pedal crank 36 is provided with a recess in regular octagon corresponding to the axle head 29. The axle head with a cross section in regular octagon is inserted into the recess on the pedal crank corresponding to the axle head, and is fixed by the bolts 17, 18 respectively. Moreover, the axle head 29 is provided with a pair of parallel surfaces perpendicular to the length direction of the crank 19 of the middle axle, the axle head 30 is provided with a pair of parallel surfaces perpendicular to the length direction of the crank 20 of the middle axle; the recess in regular octagon on the pedal crank 11 is provided with a pair of parallel surfaces perpendicular to the length direction of the pedal crank 11, the recess in regular octagon on the pedal crank 36 is provided with a pair of parallel surfaces perpendicular to the length direction of the pedal crank 36; in this way, when the angle between the pedal crank 36 and the crank 19 of the middle axle is 180 degrees or zero, the axle head 29 is just aligned with the recess on the pedal crank 36, that is, the axle head can be inserted into the recess. In like manner, when the angle between the pedal crank 11 and the crank 20 of the middle axle is 180 degrees or zero, the axle head 30 is just aligned with the recess 35 on the pedal crank 11, that is, the axle head can be inserted into the recess. Both the axle head 30 and the recess 35 have cross sections in regular octagon, so when the axle head 30 is aligned with the recess 35 corresponding to the axle head 30, and the pedal crank 11 rotates around the axis of the middle axle by 45 degrees, 90 degrees or 180 degrees, the axle head 30 is still aligned with the recess 35; in like manner, when the axle head 29 is aligned with the recess corresponding to the axle head 29, and the pedal crank 36 rotates around the axis of the middle axle by 45 degrees, 90 degrees or 180 degrees, the axle head 29 is still aligned with the recess corresponding to the axle head 29. In this way, by changing the assembly angle of the pedal crank on the axle head, the angle between the assembled pedal cranks 36, 11 can be zero or 180 degrees; it is also acceptable that both the included angles between the pedal crank 36 and the crank 19 of the middle axle as well as the pedal crank 11 and the crank 20 of the middle axle are 180 degrees. The crank 19 of the middle axle is parallel with the crank 20 of the middle axle.

FIG. 3 illustrates the assembled crank shaft and its installation on the bicycle frame, wherein the two pedal cranks are parallel and have an included angle of 180 degrees with the crank of the middle axle. The bicycle frame 5 is provided with bearing supports 40, 41; the main journal 27 of the middle axle is arranged on the bearing support 40, is covered by the bearing cover 38 and is fixed by bolts; the main journal 28 of the middle axle is arranged on the bearing support 41, is covered by the bearing cover 39 and is fixed by bolts.

The Second Embodiment

Figure 4:
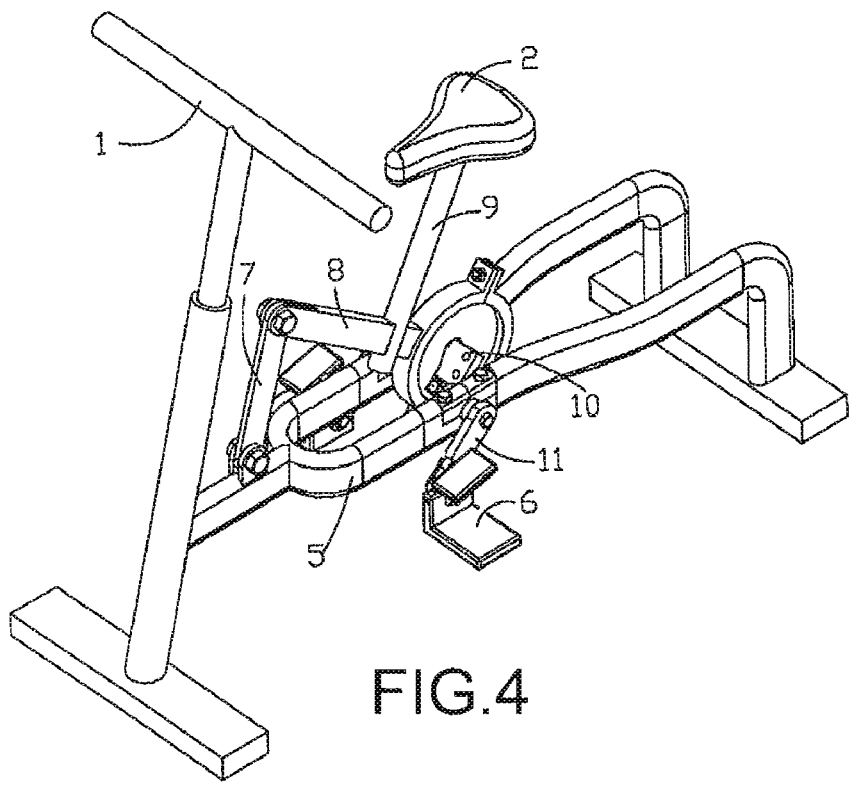
FIG. 4 is a perspective view of an exercise bicycle in which a crank-rocker mechanism is arranged on the bicycle frame, and a middle axle is formed by a straight shaft and an eccentric wheel.

Referring to each drawing, the second embodiment is an embodiment corresponding to the second solution of the summary of the invention and its improvement. FIG. 4 is a perspective view of this embodiment. An exercise bicycle comprises a bicycle frame 5, a seat 2 arranged above the middle part of the bicycle frame 5, a handle bar 1 arranged above the front part of the bicycle frame 5, a middle axle 10 arranged below the middle part of the bicycle frame 5, a pair of pedal cranks 11, 36 respectively fixedly connected to two ends of the middle axle 10, and two pedals 6, 37 respectively connected to the pair of pedal cranks, wherein the middle axle 10 is formed by arranging an eccentric wheel 52 on a straight shaft 42, the eccentric wheel 52 is fixedly connected with the straight shaft 42; a connecting rod 8 and a rocker 7 are provided, the eccentric wheel 52 is rotationally connected with one end of the connecting rod 8, the other end of the connecting rod 8 is articulated with one end of the rocker 7, the other end of the rocker 7 is articulated to the bicycle frame 5, the kinetic characteristic of the mechanism made up of the middle axle 10, the connecting rod 8, the rocker 7 and the bicycle frame 5 is in accordance with that of the crank-rocker mechanism; the position of the seat 2 is fixed relatively to that of the connecting rod 8, and the seat 2 is fixed on the connecting bar 8 through the seat supporting stand 9.

Figure 5:
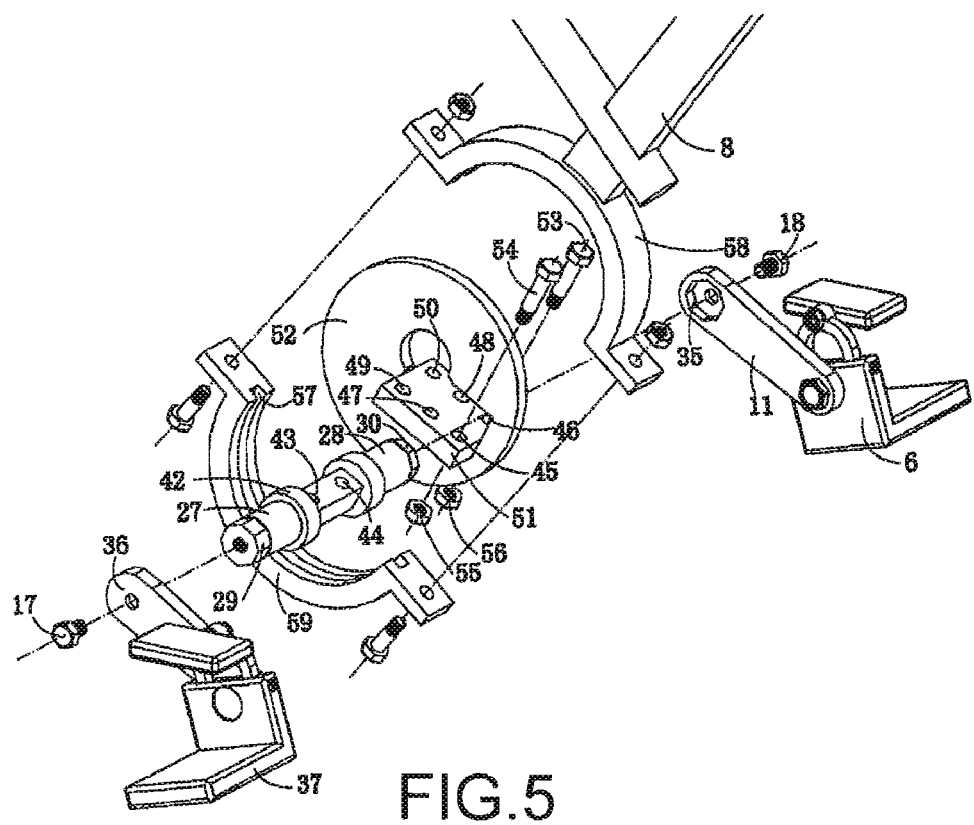
FIG. 5, illustrating the structure of a middle axle formed by a straight shaft and an eccentric wheel, is an assembly drawing.
Figure 6:
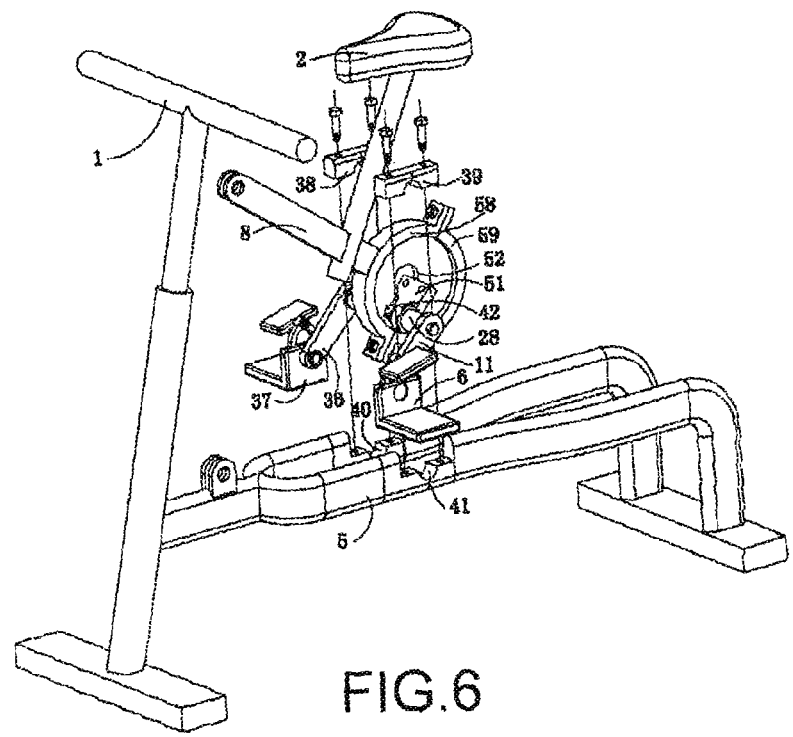
FIG. 6 is a drawing of assembling the assembled middle axle formed by the straight shaft and the eccentric wheel on the bicycle frame.

As shown in FIGS. 5, 6, the middle shaft 10 is formed by the straight shaft 42 and the eccentric wheel 52. The eccentric wheel 52 is rotationally connected with one end of the connecting rod 8, the end portion of the connecting rod 8 is provided with the eccentric wheel support 58 and the eccentric wheel cover 59, the cylinder surface of the eccentric wheel cover 59 opposite to the eccentric wheel support 58 is provided with the groove 57, and the cylinder surface of the eccentric wheel support 58 is further provided with a corresponding groove. After the eccentric wheel cover 59 is closed relative to the eccentric wheel support 58 and fixed by bolts, the groove thereon is closed to form an annular groove, and the outer edge of the eccentric wheel 52 can rotate within the annular groove. The straight shaft fixing bracket 51 is arranged at the middle part of the eccentric wheel 52, and is provided with a fixing hole for fixing the straight shaft 42. The cross section of the middle part of the straight shaft 42 is a square, and is provided with a fixing hole corresponding to the fixing hole on the fixing bracket. The bolt 54 passes through the fixing hole 43 on the straight shaft 42, and the fixing hole 45 on the straight shaft fixing bracket 51, and the nut 55 is screwed down; the bolt 53 passes through the fixing hole 44 on the straight shaft 42, and the fixing hole 46 on the straight shaft fixing bracket 51, and the nut 56 is screwed down. In this way, the eccentric wheel is fixedly connected to the straight shaft 42, and the offset distance is the distance between the center lines of the fixing holes 49, 45. The eccentric wheel can be also fixed on the straight shaft 42 through the fixing holes 47, 48, here, the offset distance is the distance between the center lines of the fixing holes 49, 47. The eccentric wheel can be also fixed on the straight shaft 42 through the fixing holes 49, 50, here, the offset distance is zero.

As shown in FIGS. 5, 6, the axle heads 29, 30 at the two ends of the middle axle 10 are cylinders with cross sections in regular octagon, the end portion of the pedal crank 11 is provided with a recess 35 in regular octagon matching with the axle head 30 being a cylinder with a cross section in regular octagon, and the pedal crank 36 is provided with a recess in regular octagon corresponding to the axle head 29. The axle head with a cross section in regular octagon is inserted into the recess on the pedal crank corresponding to the axle head, and is fixed by the bolts 17, 18 respectively. Moreover, the axle head 29 is provided with a pair of parallel surfaces perpendicular to the crank equivalent to the eccentric wheel 52, that is, perpendicular to the vertical lines of the rotational axis of the eccentric wheel 52 via the geometric center of the eccentric wheel, the axle head 30 is provided with a pair of parallel surfaces perpendicular to the crank equivalent to the eccentric wheel 52; the recess in regular octagon on the pedal crank 11 is provided with a pair of parallel surfaces perpendicular to the lengthwise direction of the pedal crank 11, the recess in regular octagon on the pedal crank 36 is provided with a pair of parallel surfaces perpendicular to the length direction of the pedal crank 36; in this way, when the angle between the pedal crank 36 and the crank equivalent to the eccentric wheel 52 is 180 degrees or zero, the axle head 29 is just aligned with the recess on the pedal crank 36, that is, the axle head can be inserted into the recess. In like manner, when the angle between the pedal crank 11 and the crank equivalent to the eccentric wheel 52 is 180 degrees or zero, the axle head 30 is just aligned with the recess 35 on the pedal crank 11, that is, the axle head can be inserted into the recess. Both the axle head 30 and the recess 35 have cross sections in regular octagon, so when the axle head 30 is aligned with the recess 35 corresponding to the axle head 30, and the pedal crank 11 rotates around the axis of the middle axle by 45 degrees, 90 degrees or 180 degrees, the axle head 30 is still aligned with the recess 35; in like manner, when the axle head 29 is aligned with the recess corresponding thereto, and after the pedal crank 36 rotates around the axis of the middle axle by 45 degrees, 90 degrees or 180 degrees, the axle head 29 is still aligned with the recess corresponding thereto. In this way, by changing the assembly angle of the pedal crank on the axle head, the included angle of the pedal cranks 36, 11 is zero or 180 degrees after assembly; it is also acceptable that both the included angles between the pedal crank 36 and the crank equivalent to the eccentric wheel 52 as well as the pedal crank 11 and the crank equivalent to the eccentric wheel 52 are 180 degrees.

FIG. 6 is a drawing of assembling the assembled middle axle formed by the straight shaft and the eccentric wheel on the bicycle frame, wherein the two pedal cranks are parallel to one another and have an included angle of 180 degrees with the crank equivalent to the eccentric wheel. Referring to FIGS. 5, 6, the bicycle frame 5 is provided with bearing supports 40, 41; the main journal 27 of the middle axle is arranged on the bearing support 40, is covered by the bearing cover 38 and is fixed by bolts; the main journal 28 of the middle axle is arranged on the bearing support 41, is covered by the bearing cover 39 and is fixed by bolts.

The Third Embodiment

Figure 7:
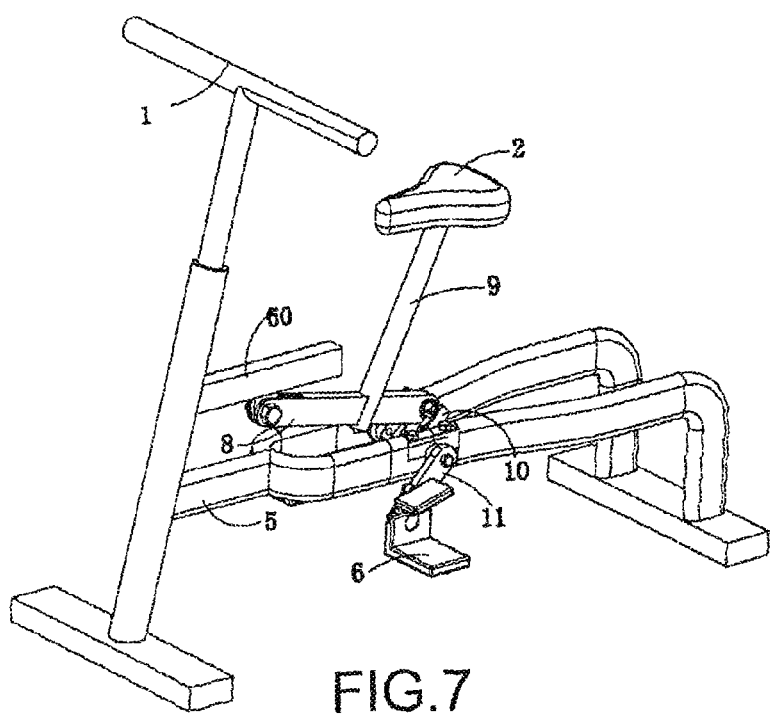
FIG. 7 is a perspective view of an exercise bicycle in which a crank-slider mechanism is arranged on the bicycle frame and the middle axle is a crank shaft.

Referring to each drawing, the third embodiment is an embodiment corresponding to the third solution of the summary of the invention and its improvement. FIG. 7 is a perspective view of this embodiment. An exercise bicycle comprises a bicycle frame 5, a seat 2 arranged above the middle part of the bicycle frame 5, a handle bar 1 arranged above the front part of the bicycle frame 5, a middle axle 10 arranged below the middle part of the bicycle frame 5, a pair of pedal cranks respectively fixedly connected to two ends of the middle axle 10, and two pedals respectively connected to the pair of pedal cranks, wherein the middle axle 10 is a crank shaft; a connecting rod 8 is provided, one end of the connecting rod 8 is rotationally connected with the crank pin journal 12 of the middle axle 10, the other end of the connecting rod is articulated with a slider 61 which is in slip connection with a slider groove 60 fixedly connected to the bicycle frame 5; the middle axle 10, the connecting rod 8, the slider 61, the slider groove 60 and the bicycle frame 5 make up a crank-slider mechanism; the position of the seat 2 is fixed relatively to that of the connecting rod 8, and the seat 2 is fixed on the connecting rod 8 through the seat supporting stand 9.

Figure 8:
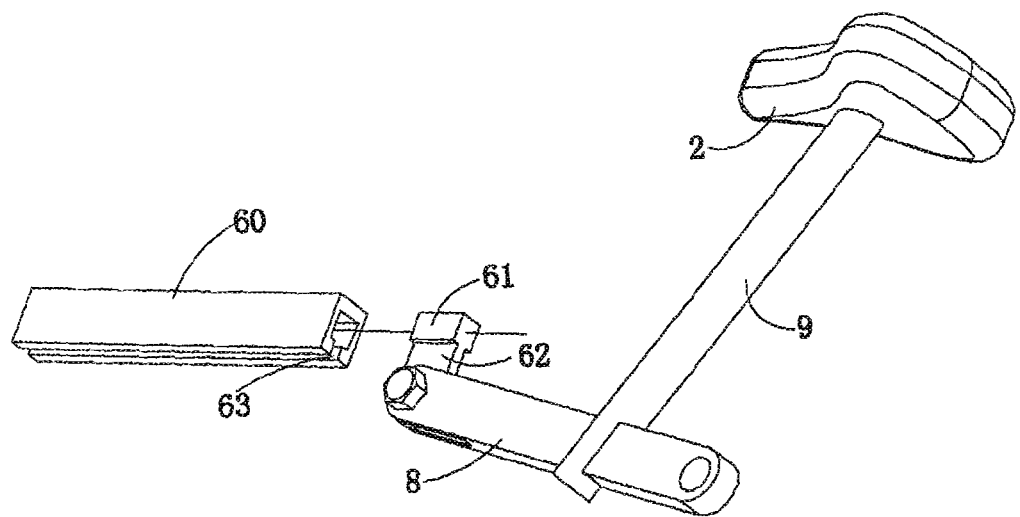
FIG. 8, illustrating the structures of a slider groove and a slider, is an assembly drawing.

FIG. 8, illustrating the structures of a slider groove 60 and a slider 61, is an assembly drawing, wherein the slider 61 can slide inside the corresponding cavity in the slider groove 60. The elongated opening 63 is arranged at the bottom of the slider groove 60. The articulating handle 62 protruding the slider 61 slides along the elongated opening 63 with the slider when the slider 61 slides in the slider groove.

In the embodiment, the implementation structure and the assembly of the middle axle 10 and the two pedal cranks are the same as that stated in the first embodiment.

The Fourth Embodiment

Figure 9:
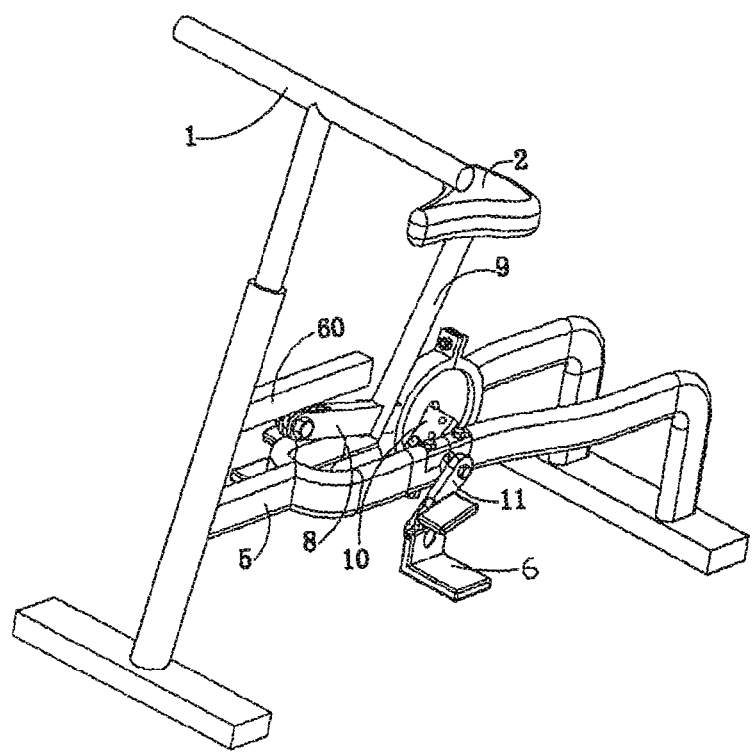
FIG. 9 is a perspective view of an exercise bicycle in which a crank-slider mechanism is arranged on the bicycle frame and the middle axle is formed by the straight shaft and the eccentric wheel.

Referring to each drawing, the fourth embodiment is an embodiment corresponding to the fourth solution of the summary of the invention and its improvement. FIG. 9 is a perspective view of this embodiment. An exercise bicycle comprises a bicycle frame 5, a seat 2 arranged above the middle part of the bicycle frame 5, a handle bar 1 arranged above the front part of the bicycle frame 5, a middle axle 10 arranged below the middle part of the bicycle frame 5, a pair of pedal cranks respectively fixedly connected to two ends of the middle axle 10, and two pedals respectively connected to the pair of pedal cranks, wherein the middle axle 10 is formed by arranging an eccentric wheel on a straight shaft, the eccentric wheel is fixedly connected with the straight shaft; a connecting rod 8 is provided, the eccentric wheel is rotationally connected with one end of the connecting rod, the other end of the connecting rod 8 is articulated with a slider which is in slip connection with a slider groove 60 arranged on the bicycle frame, the kinetic characteristic of the mechanism made up of the middle axle 10, the connecting rod 8, the slider, the slider groove 60 and the bicycle frame 5 is in accordance with that of the crank-slider mechanism; the position of the seat 2 is fixed relatively to that of the connecting rod 8, and the seat 2 is fixed on the connecting rod 8 through the seat supporting stand 9.

In the embodiment, the implementation structure and the assembly of the middle axle 10 and the two pedal cranks are the same as that stated in the second embodiment.

In the embodiment, the implementation of the slider and the slider groove is the same as the implementation stated in the third embodiment.

The Fifth Embodiment

Figure 10:
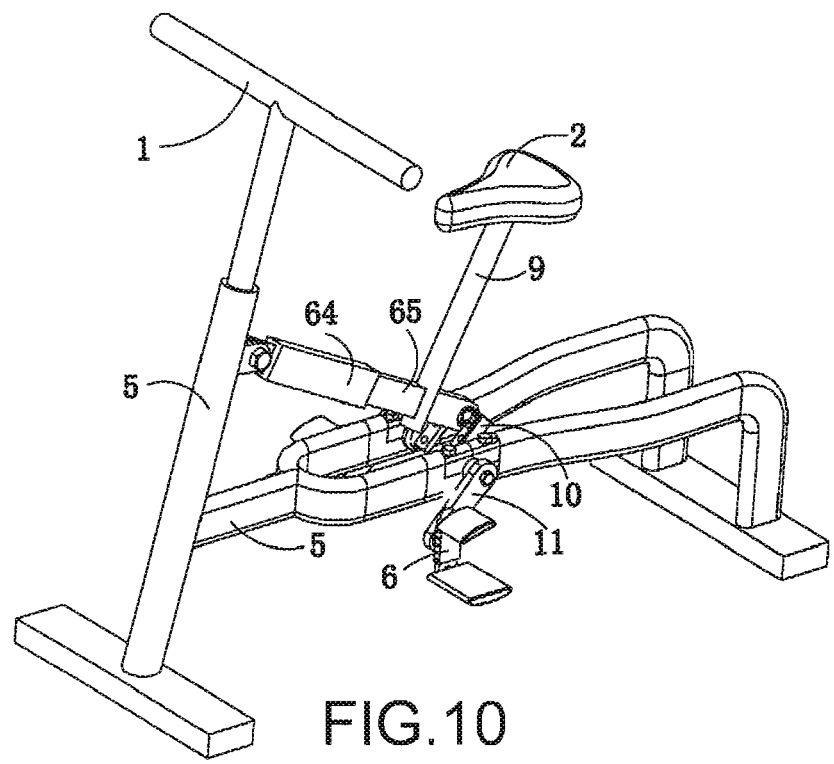
FIG. 10 is a perspective view of an exercise bicycle in which a crank-swing block mechanism is arranged on the bicycle frame and the middle axle is a crank shaft.

Referring to each drawing, the fifth embodiment is an embodiment corresponding to the fifth solution of the summary of the invention and its improvement. FIG. 10 is a perspective view of this embodiment. An exercise bicycle comprises a bicycle frame 5, a seat 2 arranged above the middle part of the bicycle frame 5, a handle bar 1 arranged above the front part of the bicycle frame 5, a middle axle 10 arranged below the middle part of the bicycle frame 5, a pair of pedal cranks respectively fixedly connected to two ends of the middle axle, and two pedals respectively connected to the pair of pedal cranks, wherein the middle axle 10 is a crank shaft; a guide rod 65 is provided, one end of the guide rod is rotationally connected with the crank pin journal 12 of the middle axle 10, the other end of the guide rod is in slip connection with a swing block 64 articulated to the bicycle frame; the middle axle 10, the guide rod 65, the swing block 64 and the bicycle frame 5 make up a crank-swing block mechanism; the position of the seat 2 is fixed relatively to that of the guide rod 65, and the seat 2 is fixed on the guide rod 65 through the seat supporting stand 9.

In the embodiment, one end of the guide rod 65 is rotationally connected with the crank pin journal of the middle shaft 10, which is the same as the connection way of the connecting rod 8 with the crank pin journal 12 in the first embodiment; the other end of the guide rod 65 is in slip connection with the swing block 64 articulated with the bicycle frame 5, and the end portion of the guide rod 65 is inserted into the corresponding housing of the swing block 64, and can do piston motion in the housing.

In the embodiment, the implementation structure and the assembly of the middle axle 10 and the two pedal cranks are the same as the implementation method stated in the first embodiment.

The Sixth Embodiment

Figure 11:
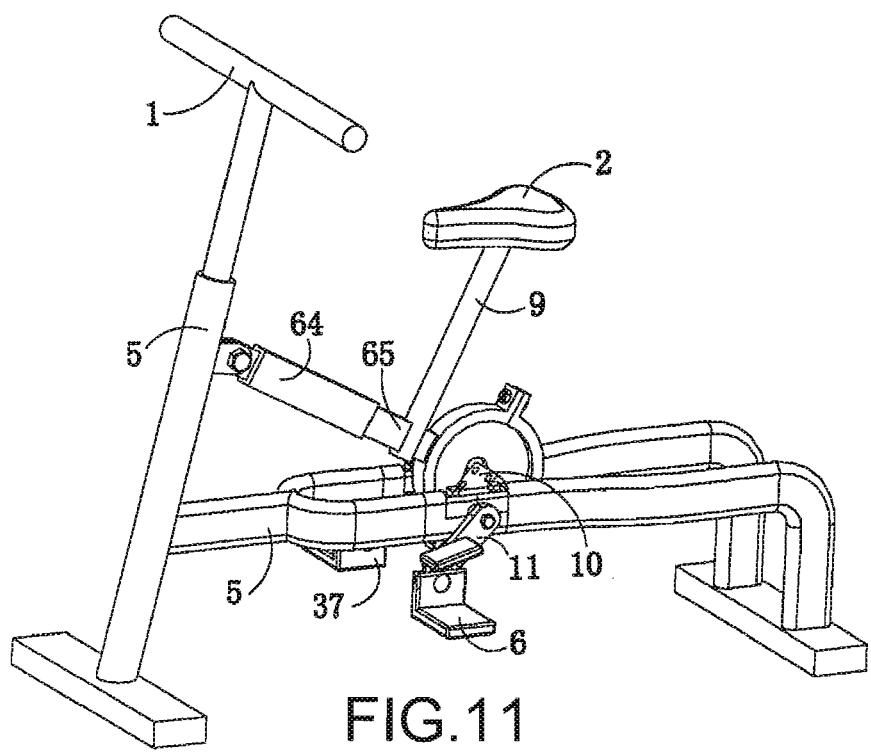
FIG. 11 is a perspective view of an exercise bicycle in which a crank-swing block mechanism is arranged on the bicycle frame and the middle axle is formed by the straight shaft and the eccentric wheel.

Referring to each drawing, the sixth embodiment is an embodiment corresponding to the sixth solution of the summary of the invention and its improvement. FIG. 11 is a perspective view of this embodiment. An exercise bicycle comprises a bicycle frame 5, a seat 2 arranged above the middle part of the bicycle frame 5, a handle bar 1 arranged above the front part of the bicycle frame 5, a middle axle 10 arranged below the middle part of the bicycle frame, a pair of pedal cranks respectively fixedly connected to two ends of the middle axle 10, and two pedals respectively connected to the pair of pedal cranks, wherein the middle axle 10 is formed by arranging an eccentric wheel on a straight shaft, the eccentric wheel is fixedly connected with the straight shaft; a guide rod 65 is provided, the eccentric wheel is rotationally connected with one end of the guide rod 65, the other end of the guide rod 65 is in slip connection with a swing block 64 articulated to the bicycle frame; the kinetic characteristic of the mechanism made up of the middle axle 10, the guide rod 65, the swing block 64 and the bicycle frame 5 is in accordance with that of the crank-swing block mechanism; the position of the seat 2 is fixed relatively to that of the guide rod 65, and the seat 2 is fixed on the guide rod 65 through the seat supporting stand 9.

In the embodiment, the implementation structure and the assembly of the middle axle 10 and the two pedal cranks are the same as the implementation method stated in the second embodiment. The implementation of the guide rod 65 connected with one end of the eccentric wheel is the same as that of the connecting rod 8 connected with the eccentric wheel 52 in the second embodiment. The other end is in slip connection with the swing block 64 articulated with the bicycle frame 5, and the end portion of the guide rod 65 is inserted into the corresponding housing of the swing block 64, and can do piston motion in the housing.

The specific implementation of the improved solutions of the pedal is explained in detail below.

The First Embodiment of Pedal

Figure 12:
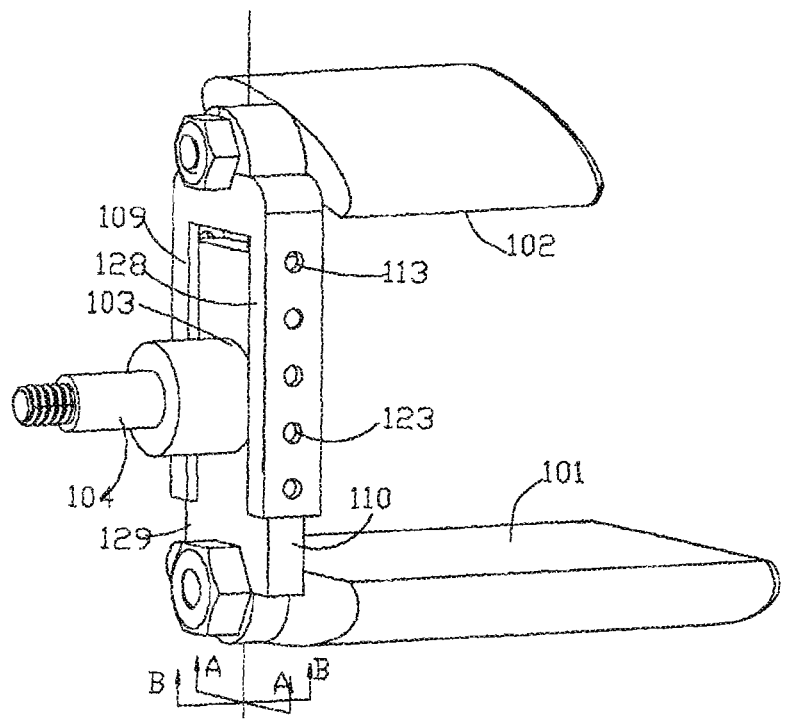
FIG. 12 is a perspective view of the pedals of the first embodiment of pedal.
Figure 13:
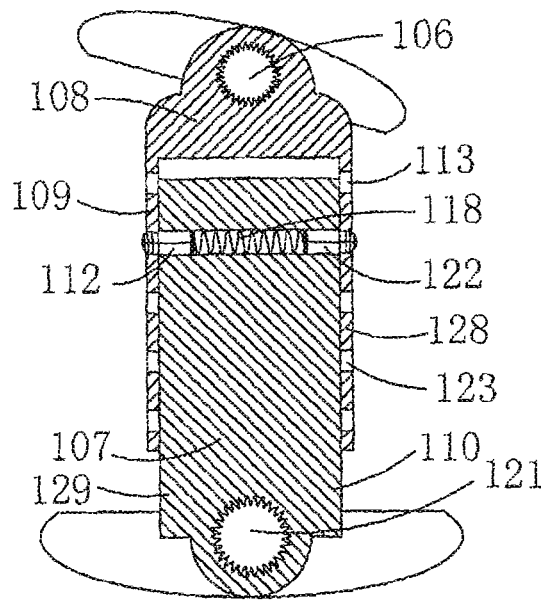
FIG. 13 is an A-A sectional view of the supporting frame of pedal shown in FIG. 12.
Figure 14:
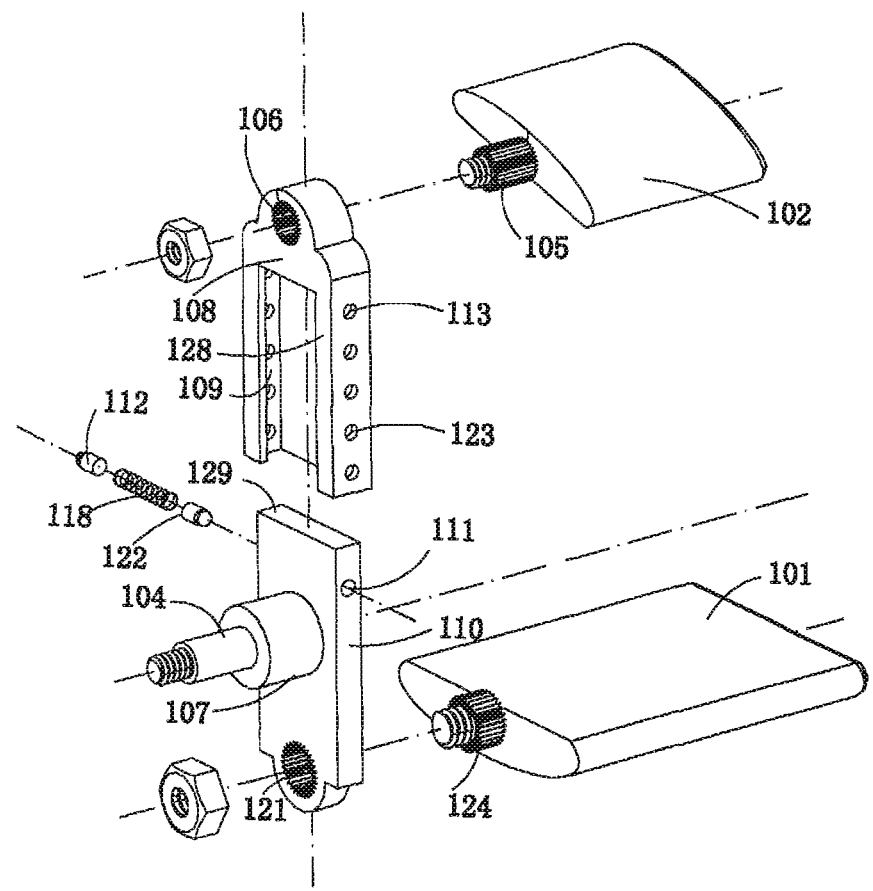
FIG. 14 is an assembly drawing of the pedal in the first embodiment of pedal.
Figure 15:
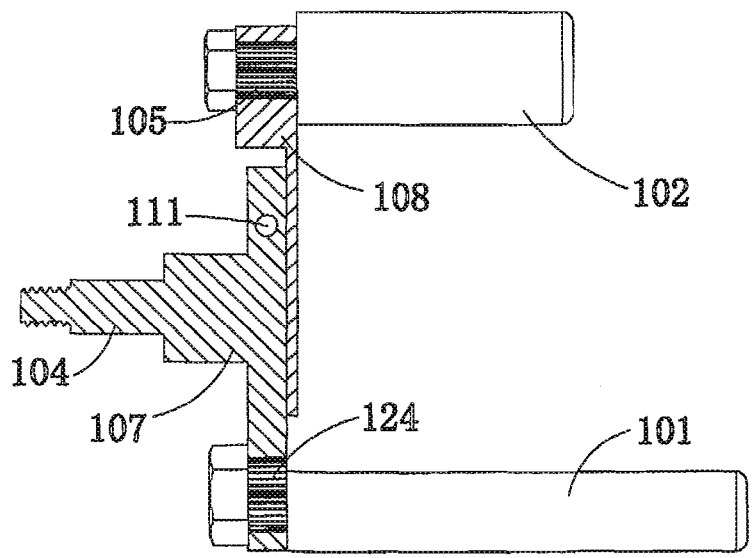
FIG. 15 is a B-B sectional view of the supporting frame of pedal shown in FIG. 12.
Figure 16:
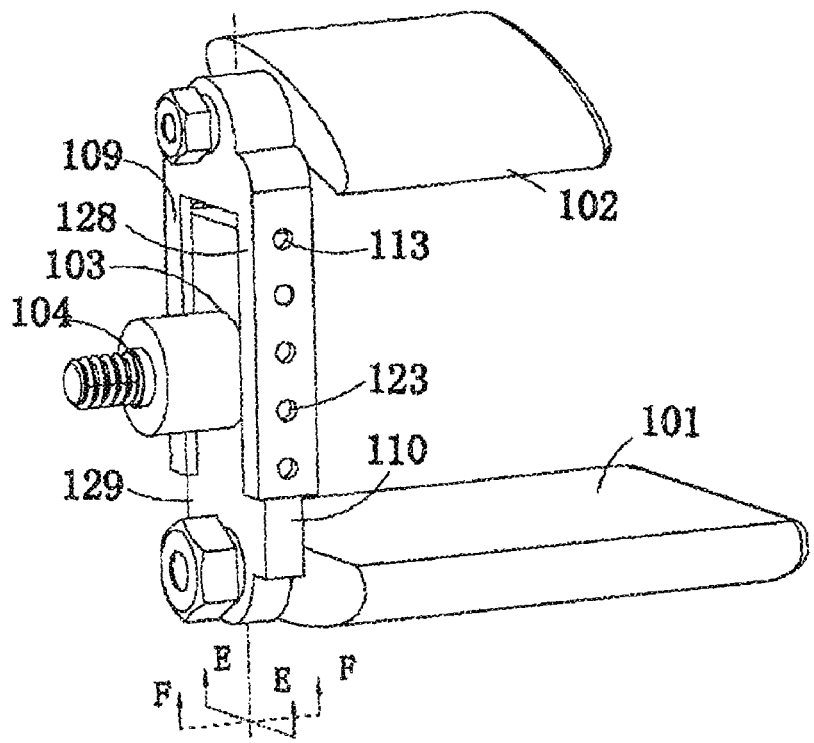
FIG. 16 is a perspective view of the pedals of the second embodiment of pedal.
Figure 17:
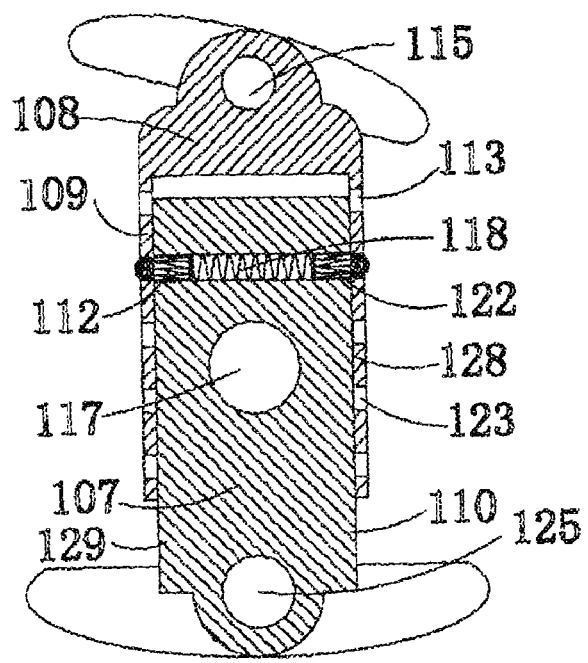
FIG. 17 is an E-E sectional view of the supporting frame of pedal shown in FIG. 16.
Figure 18:
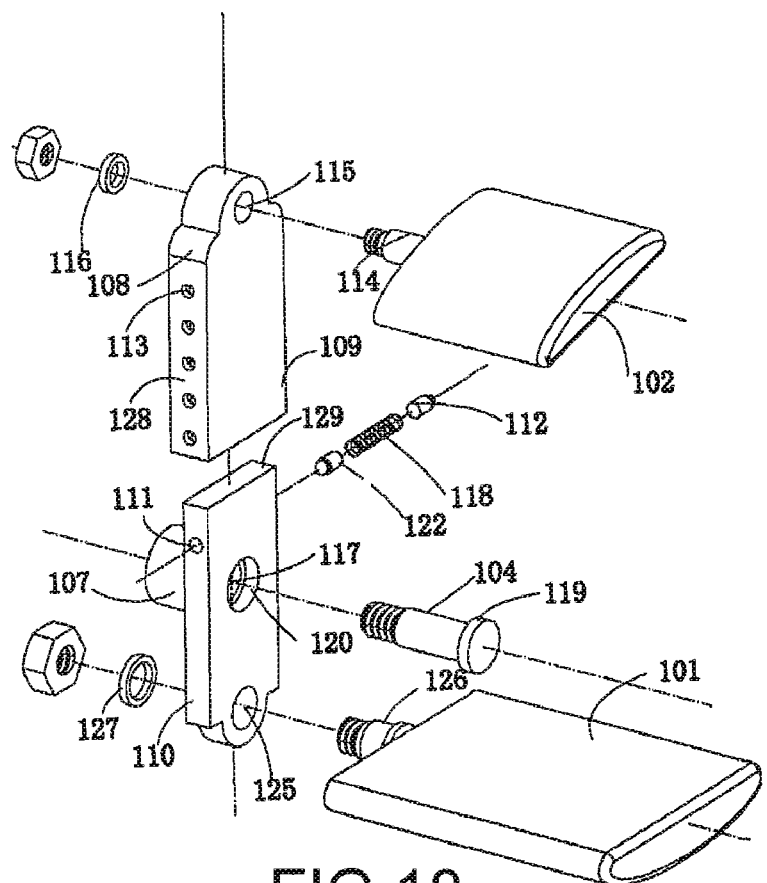
FIG. 18 is an assembly drawing of the pedal in the second embodiment of pedal.
Figure 19:
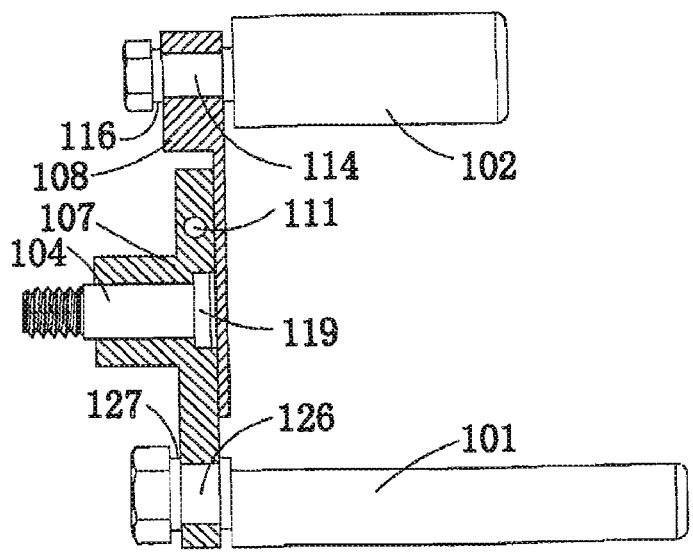
FIG. 19 is an F-F sectional view of the pedal supporting frame shown in FIG. 16.

Refer to FIGS. 12, 13, 14, 15. FIG. 12 is a perspective view showing the first embodiment of pedal, wherein the pedal shaft and the supporting frame are fixed with the pedal. The pedal comprises a sole part 101, an instep part 102, a supporting frame 103 and a pedal shaft 104, wherein the supporting frame 103 comprises an upper end and a lower end; one end of the sole part 101 is fixedly connected with the lower end of the supporting frame 103; one end of the instep part 102 is fixedly connected with the upper end of the supporting frame 103; the instep part 102 and the sole part 101 are positioned at the same side of the supporting frame 103; one end of the pedal shaft 104 is fixedly connected to the supporting frame 103 at the position between the sole part 101 and the instep part 102, the pedal shaft 104 is positioned on the supporting frame 103 at the opposite side to the sole part 101 and the instep part 102; the pedal shaft is fixedly connected with the pedal crank generally, because the pedal shaft 104 in the embodiment is fixedly connected on the supporting frame 103, the pedal shaft is required to be rotationally connected with the pedal crank when such a pedal is used; in the state that the sole part 101 is under the instep part 102, the axis of the pedal shaft 104 is positioned above the center of gravity of the mechanism formed by the connection of the supporting frame 103, the instep part 102 and the sole part 101; the instep part 102 has a length in the direction of the axis of the pedal shaft 104 less than the length of the sole part 101 in the direction of the axis of the pedal shaft 104.

In the embodiment, the sole part 101 is fixedly connected with the supporting frame 103, and the fixed connection mechanism can regulate the connection angle between the sole part 101 and the supporting frame 103. A fixing shank 105 is arranged at one end of the sole part 101 connected with the supporting frame 103, straight teeth with the same shape are evenly distributed on the cylinder surface of the fixing shank 105, the fixing hole 106 is arranged on the supporting frame, and the shape of the cross section of the fixing hole 106 is same as that of the fixing shank 105. The straight teeth on the fixing shank 105 and the teeth in the fixing hole 106 have the function of circumferential fixation. In the assembly, the fixing shank 105 is inserted into and matched with the fixing hole 106, and the sole part 101 cannot rotate relative to the supporting frame 103. Due to even distribution of the straight teeth, if the fixing shank 105 can be inserted into the fixing hole 106 at the current angle, the fixing shank 105 after rotation can also be inserted into the fixing hole 106 each time the sole part 101 rotates by an included angle between adjacent straight teeth. In this way, the sole part 101 can be fixed on the supporting frame at different angles, thereby playing the role of regulating the fixed connection angle between the sole part 101 and the supporting frame 103. The sole part 101 is also fixedly connected with the supporting frame 103, and its connection mechanism is same as that between the sole part 101 and the supporting frame 103.

In the embodiment, the supporting frame 103 is provided with a mechanism for regulating the distance between the connection position of the instep part 102 on the supporting frame 103 as well as the connection position of the sole part 101 on the supporting frame 103. The supporting frame 103 consists of two members: the sole member 107 of the supporting frame connected with the sole part 101, and the instep member 108 of the supporting frame connected with the instep part 102. Parallel elongated guide grooves 109, 128 are arranged at the two sides of the instep member 108 of the supporting frame, and the openings of the guide grooves at the two sides are opposite to each other, ten location holes 113 are arranged at the bottom of the guide grooves at the two sides, and the location holes at the two sides correspond one to one; elongated straight sides 110, 129 corresponding to the guide grooves are arranged at the two sides of the sole member 107 of the supporting frame, and can slide in the corresponding guide grooves. The end portion of one end at which the sole member 107 of the supporting frame slides within the guide grooves at the two sides is provided with a cylindrical through hole 111 communicating with the elongated straight sides at the two sides. Location pins 112, 122 are arranged at the two sides within the through hole 111, and a spring 118 is arranged between the two location pins 112, 122. The location pins 112, 122 are divided into a front section and a rear section, the front section having a diameter less than the rear section. The elongated straight sides at the two sides slide in the corresponding guide grooves. When the through hole 111 is aligned with the location holes corresponding to the bottom of the guide grooves at the two sides, the front sections of the location pins 112, 122 at the two sides are ejected into the location holes due to the action of the spring 118. The rear sections of the location pins 112, 122 are clamped at the edge of the location holes due to the diameter of the rear section larger than that of the front section. In this way, the elongated straight sides cannot slide within the guide grooves, which plays a role of location. When it is desired to regulate the distance between the connection position of the instep part 102 on the supporting frame 103 as well as the connection position of the sole part 101 on the supporting frame 103, the front sections of the location pins 112, 122 at the two sides are pressed back to the through hole 111 from the location hole, and the sole member 107 of the supporting frame can slide relative to the instep member 108 of the supporting frame. When the sole member 107 of the supporting frame slides to the location hole adjacent to the current location hole and is aligned with the through hole 111 again, the front sections of the location pins are ejected into the location hole to realize the location once again. The distance between the connection position of the instep part 102 on the supporting frame 103 as well as the connection position of the sole part 101 on the supporting frame 103 can be regulated by repeating the above process.

The Second Embodiment of Pedal

Refer to FIGS. 16, 17, 18, 19. The implementation of this embodiment differs from that of the first embodiment of pedal in that: in the first embodiment of pedal, the sole part 101, the instep part 102 and the pedal shaft 104 are fixedly connected with the supporting frame 103, while in this embodiment, the sole part 101, the instep part 102 and the pedal shaft 104 are rotationally connected with the supporting frame 103. The implementations of other parts are same as that in the first embodiment of pedal.

The sole part 101 is connected with the supporting frame 103 by a pivot shaft. The pivot shaft 114 is arranged at one end of the sole part 101 connected with the supporting frame 103, the pivot shaft hole 115 corresponding to the pivot shaft 114 is provided on the supporting frame, the pivot shaft 14 is inserted into the pivot shaft hole 115, is sleeved with a bushing 116, and is fixed by a retaining nut to realize axial fixation. The instep part 102 and the supporting frame 103 are connected with each other by a pivot shaft, and the implementation of the connection is same as that of the sole part 101 and the supporting frame 103.

The pedal shaft 104 is rotationally connected with the supporting frame 103, and the pedal shaft hole 117 corresponding to the pedal shaft 104 is provided on the sole member 107 of the supporting frame. The shaft collar 119 is arranged at the end portion of the pedal shaft 104, and has the function of axial fixation. The shaft collar groove 120 is provided on the sole member 107 of the supporting frame so that the shaft collar 119 is positioned inside the shaft collar groove, which does not affect the relative sliding of the sole member 107 of the supporting frame to the instep member 108 of the supporting frame.

In Pedal solution A and Pedal solution B recorded in the part of the technical solution, the sole part can be rotationally or fixedly connected with the supporting frame, and the instep part can be rotationally or fixedly connected with the supporting frame. The specific embodiment of the rotational connection may be in accordance with the second embodiment of pedal, and the specific embodiment of the fixed connection may be in accordance with the first embodiment of pedal. In the implementations of the solutions of pedal A and B, the external surface of the instep part and the surface of the sole part not contacted with the sole are provided with protective layers made of a relatively soft material, such as rubber and sponge, thereby preventing pedals from damaging legs.

In the first and second embodiments of pedal, the surface of the sole part 101 contacted with the sole can be provided with antiskid stripes; the surface of the instep part 102 contacted with the instep can be added with a protective layer made of a relatively soft material, such as soft rubber and sponge to increase comfortability for instep when exerting force. The improvements fall into the scope of protection of the patent.

The first and second embodiments of pedal have the following advantages: when the person does not want to exert force by instep, the pedal from which the instep part 102 and the instep member 108 of the supporting frame are detached can be used, with convenient disassembly and assembly.

The application of the pedal described in the present utility model to a machine or a fitness apparatus or an amusement apparatus taking feet to exert motive force falls into the scope of protection of the patent.

The implementation of the combination of the exercise bicycle with the animal model is described in detail below.

Figure 20:
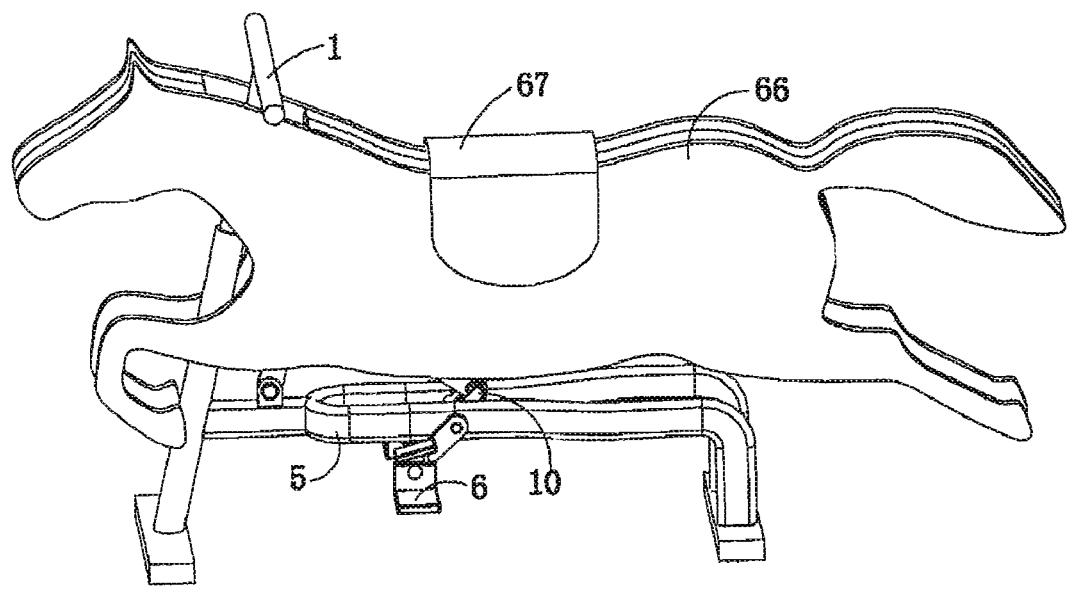
FIG. 20 is a perspective view of the exercise bicycle of the first solution combined with the horse model.

Referring to each drawing, FIG. 20 is a perspective view of the exercise bicycle in the first solution combined with the horse model, wherein the back of the horse model 66 is positioned above the middle part of the bicycle frame 5 and is provided with the cushion 67. The riding function of the seat is realized by the back of the horse model 66. The thickness of the horse model 66 does not block the realization of the pedaling action to and fro by feet during the riding. The posture of the horse model 66 is that the horse runs forwards, thereby increasing the effect of riding the horse for exercise during the riding.

Figure 21:
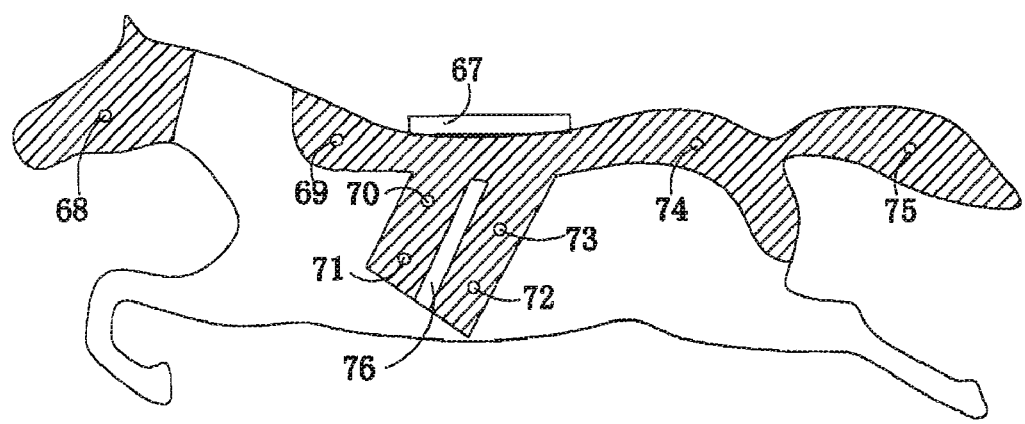
FIG. 21 is a structural view illustrating the internal structure of the horse model.
Figure 22:
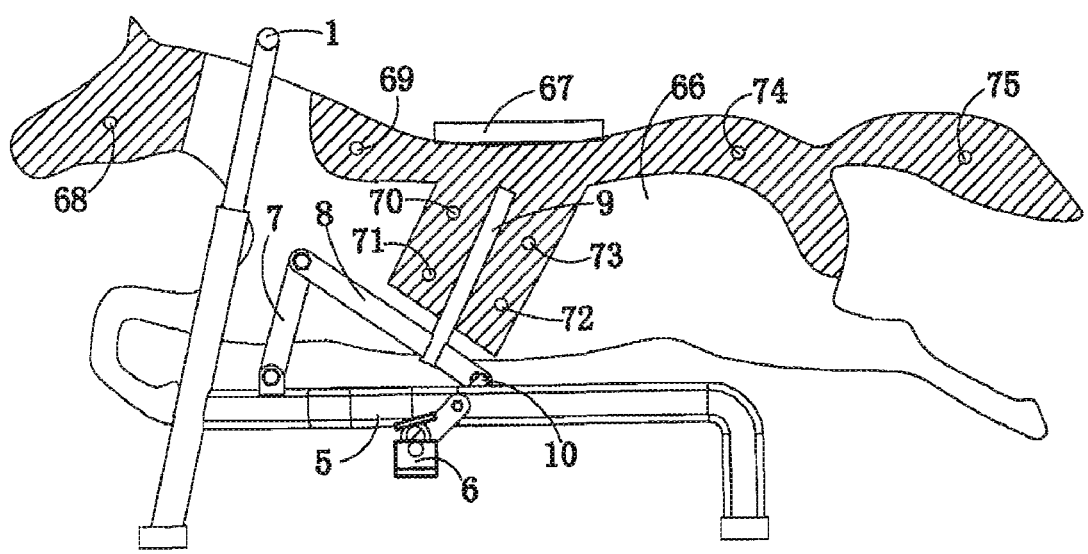
FIG. 22 is a view illustrating the relative position of the horse model and the exercise bicycle of the first solution.

The horse model 66 consists of a right part and a left part which are symmetrical, with its internal structure as shown in FIG. 21, and the relative position to the bicycle frame 5 is shown in FIG. 22. The left part of the horse model 66 is positioned at the left side of the bicycle frame 5, and the right part of the horse model 66 is positioned at the right side of the bicycle frame 5, the two parts are aligned along the edges and then closed, between which a bicycle body is held. The hatching part shown in FIGS. 21, 22 is a contact surface of the left part and the right part of the horse model 66 when closed. The closed horse model 66 is a continuous entity in appearance. Bolt holes 68-75 are arranged within the contact surface of the left part and the right part of the horse model 66. The bolt holes at the two sides are jointed together when the model is closed, bolts pass through the bolt holes and are screwed down by nuts, and the two parts of the model are fixedly and integrally connected. The internal contact surface of the two parts of the horse model 66 is provided with fixing grooves 76, and the seat supporting stand 9 is clamped by the fixing grooves 76 at the two sides, which plays the role of fixing the horse model 66 on the connecting rod 8. The exercise bicycle stated in the second solution, the third solution, the fourth solution, the fifth solution and the sixth solution can be combined with the horse model using the same method. Other animals such as dolphin, fish, deer, leopard and tiger can be used instead of horse.

Figure 23:
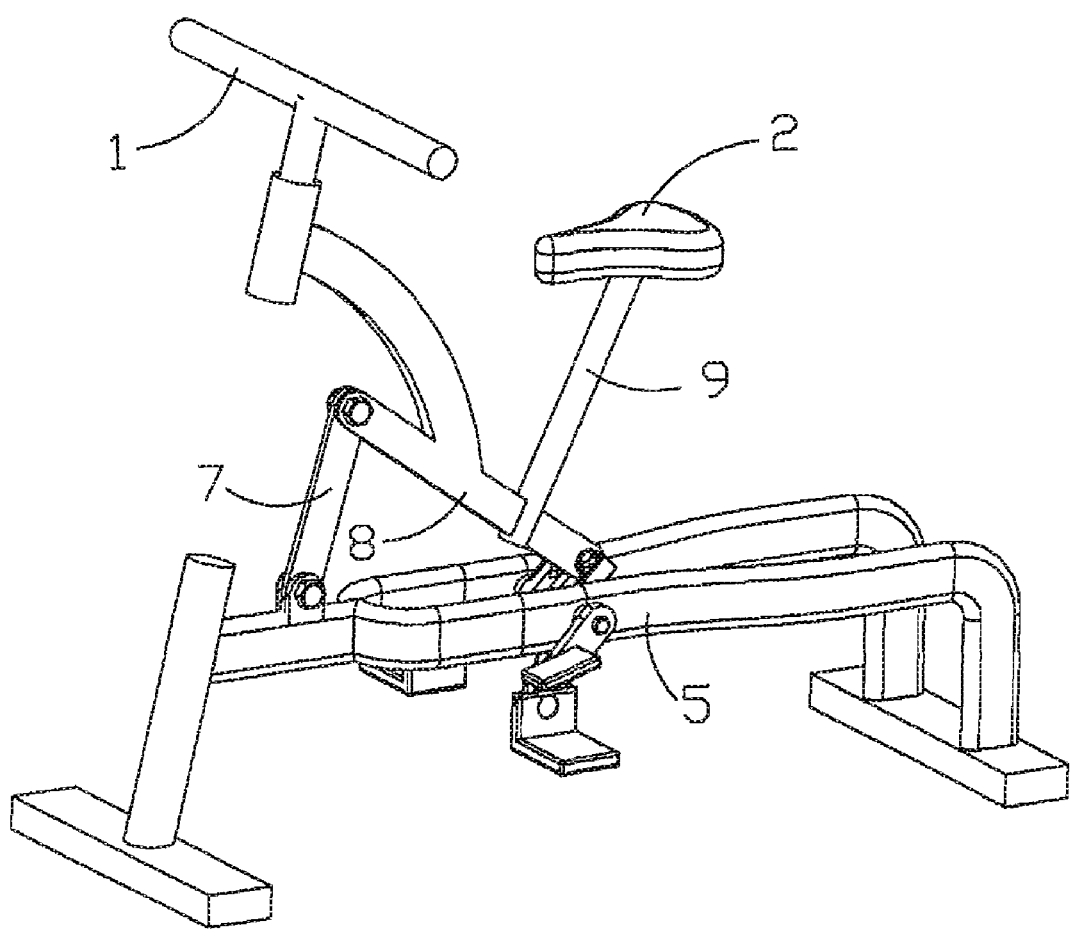
FIG. 23 is a perspective view implementing the solution that the handle bar is connected to the connecting rod.

FIG. 23 shows the implementation of the improved solution that the handle bar is fixed on the connecting rod 8 or the guide rod 65. Taking the exercise bicycle stated in the first solution as an example, the handle bar 1 is connected to the connecting rod 8. In this way, the person will do relative movement all over the body to the bicycle frame while riding the bicycle, thereby increasing enjoyment. In the technical solution with the animal model, it can be ensured that the handle bar does relative movement of rotation instead of translation to the animal model, thereby avoiding relative sliding between the handle bar and the animal model and overcoming the defects such as complicated model manufacture due to relative sliding.

What is claimed is:

1. An exercise bicycle comprising:
   a bicycle frame;
   a seat arranged above a middle part of the bicycle frame;
   a handle bar arranged on a front part of the bicycle frame;
   a crank shaft arranged on the middle part of the bicycle frame;
   a pair of pedal cranks respectively fixedly connected to two ends of the crank shaft;
   two pedals respectively connected to the pair of pedal cranks;
   a connecting rod; and
   a rocker; wherein a first end of the connecting rod is rotationally connected with the crank shaft, a second end of the connecting rod is articulated with a first end of the rocker, a second end of the rocker is articulated to the bicycle frame; the position of the seat is fixed relatively to that of the connecting rod;
   wherein the pair of pedal cranks are arranged so that the pair of pedal cranks are oriented in the same direction in relation to the crank shaft.

2. The exercise bicycle according to claim 1, wherein the handle bar is connected to the connecting rod.

3. The exercise bicycle according to claim 1, wherein each of the pedals includes a sole part, an instep part, a supporting frame and a pedal shaft, wherein one end of the sole part is connected with a lower end of the supporting frame; one end of the instep part is connected with an upper end of the supporting frame; the instep part and the sole part are connected to the supporting frame at the same side of the supporting frame; the pedal shaft is connected to the supporting frame at a position between the sole part and the instep part at a side opposite to the sole part and the instep part; in a state that the sole part is under the instep part, an axis of the pedal shaft is positioned above a center of gravity of a structure formed by the supporting frame, the instep part and the sole part; the instep part has a length in a direction of the axis of the pedal shaft that is less than a length of the sole part in the direction of the axis of the pedal shaft.

4. The exercise bicycle according to claim 1 further comprising an animal model, wherein a position of the animal model is fixed relatively to the connecting rod and motions of the animal model are synchronized with the connecting rod; appearance of the animal model is continuous, and a back of the animal model is positioned above the middle part of the bicycle frame and functions as the seat.

5. An exercise bicycle comprising:
   a bicycle frame;
   a seat arranged above a middle part of the bicycle frame;
   a handle bar arranged above a front part of the bicycle frame;
   a middle axle arranged below the middle part of the bicycle frame;
   a pair of pedal cranks respectively fixedly connected to two ends of the middle axle; and
   two pedals respectively connected to the pair of pedal cranks, wherein the middle axle is configured to include an eccentric wheel disposed on a straight shaft, the eccentric wheel is fixedly connected with the straight shaft; a connecting rod and a rocker are provided, a first end of the connecting rod is rotationally connected with the eccentric wheel, a second end of the connecting rod is articulated with a first end of the rocker, a second end of the rocker is articulated to the bicycle frame, and a position of the seat is fixed relatively to that of the connecting rod.

6. The exercise bicycle according to claim 5, wherein the handle bar is connected to the connecting rod.

7. The exercise bicycle according to claim 5, wherein each of the pedals comprise a sole part, an instep part, a supporting frame and a pedal shaft,
   wherein a first end of the sole part is connected with a lower end of the supporting frame; a first end of the instep part is connected with an upper end of the supporting frame; the instep part and the sole part are positioned at the same side of the supporting frame; the pedal shaft is connected to the supporting frame at a position between the sole part and the instep part, the pedal shaft is positioned on the supporting frame at a side opposite to the sole part and the instep part; in a state that the sole part is below the instep part, an axis of the pedal shaft is positioned above a gravity center of a structure formed by connecting the supporting frame, the instep part and the sole part; the instep part has a length in a direction of the axis of the pedal shaft that is less than a length of the sole part in the direction of the axis of the pedal shaft.

8. The exercise bicycle according to claim 5 further comprising an animal model, wherein a position of the animal model is fixed relatively to the connecting rod, and motions of the animal model are synchronized with the connecting rod;

appearance of the animal model is continuous, and a back of the animal model is positioned above the middle part of the bicycle frame and functions as the seat.

9. An exercise bicycle comprising:
a bicycle frame;
a seat arranged above a middle part of the bicycle frame;
a handle bar arranged above a front part of the bicycle frame;
a crank shaft arranged below the middle part of the bicycle frame;
a pair of pedal cranks respectively fixedly connected to two ends of the crank shaft; and two pedals respectively connected to the pair of pedal cranks; wherein a connecting rod is provided, a first end of the connecting rod is rotationally connected with the crank shaft, a second end of the connecting rod is articulated with a slider which is in slip connection with a slider groove fixedly connected to the bicycle frame; and a position of the seat is fixed relatively to that of the connecting rod.

10. The exercise bicycle according to claim 9, wherein the handle bar is connected to the connecting rod.

11. The exercise bicycle according to claim 9, wherein each of the pedals comprise a sole part, an instep part, a supporting frame and a pedal shaft, wherein a first end of the sole part is connected with a lower end of the supporting frame; a second end of the instep part is connected with an upper end of the supporting frame; the instep part and the sole part are positioned at the same side of the supporting frame; the pedal shaft is connected to the supporting frame at a position between the sole part and the instep part, the pedal shaft is positioned on the supporting frame at a side opposite to the sole part and the instep part; in a state that the sole part is below the instep part, an axis of the pedal shaft is positioned above a center of gravity of a structure formed by connecting the supporting frame, the instep part and the sole part; the instep part has a length in a direction of the axis of the pedal shaft that is less than a length of the sole part in the direction of the axis of the pedal shaft.

12. An exercise bicycle comprising:
a bicycle frame;
a seat arranged above a middle part of the bicycle frame;
a handle bar arranged above a front part of the bicycle frame;
a middle axle arranged below the middle part of the bicycle frame;
a pair of pedal cranks respectively fixedly connected to two ends of the middle axle; and
two pedals respectively connected to the pair of pedal cranks, wherein the middle axle is configured to include an eccentric wheel disposed on a straight shaft, the eccentric wheel is fixedly connected with the straight shaft;
a connecting rod is provided, the eccentric wheel is rotationally connected with a first end of the connecting rod, a second end of the connecting rod is articulated with a slider which is in slip connection with a slider groove arranged on the bicycle frame, and a position of the seat is fixed relatively to that of the connecting rod.

13. The exercise bicycle according to claim 12, wherein the handle bar is connected to the connecting rod.

14. The exercise bicycle according to claim 12, wherein each of the pedals comprise a sole part, an instep part, a supporting frame and a pedal shaft, wherein a first end of the sole part is connected with a lower end of the supporting frame; a second end of the instep part is connected with an upper end of the supporting frame; the instep part and the sole part are positioned at the same side of the supporting frame; the pedal shaft is connected to the supporting frame at a position between the sole part and the instep part, the pedal shaft is positioned on the supporting frame at a side opposite to the sole part and the instep part; in a state that the sole part is below the instep part, an axis of the pedal shaft is positioned above a center of gravity of a structure formed by connecting the supporting frame, the instep part and the sole part; the instep part has a length in a direction of the axis of the pedal shaft that is less than a length of the sole part in the direction of the axis of the pedal shaft.

15. An exercise bicycle comprising:
a bicycle frame;
a seat arranged above a middle part of the bicycle frame;
a handle bar arranged above a front part of the bicycle frame;
a crank shaft arranged below the middle part of the bicycle frame;
a pair of pedal cranks respectively fixedly connected to two ends of the crank shaft; and
two pedals respectively connected to the pair of pedal cranks, wherein a guide rod is provided, a first end of the guide rod is rotationally connected with the crank shaft, a second end of the guide rod is in slip connection with a swing block articulated to the bicycle frame; and a position of the seat is fixed relatively to that of the guide rod.

16. The exercise bicycle according to claim 15, wherein the handle bar is connected to the guide rod.

17. The exercise bicycle according to claim 15, wherein each of the pedals comprise a sole part, an instep part, a supporting frame and a pedal shaft, wherein a first end of the sole part is connected with a lower end of the supporting frame; a second end of the instep part is connected with an upper end of the supporting frame; the instep part and the sole part are positioned at the same side of the supporting frame; the pedal shaft is connected to the supporting frame at a position between the sole part and the instep part, the pedal shaft is positioned on the supporting frame at a side opposite to the sole part and the instep part; in a state that the sole part is under the instep part, an axis of the pedal shaft is positioned above a center of gravity of a structure formed by connecting the supporting frame, the instep part and the sole part; the instep part has a length in a direction of the axis of the pedal shaft that is less than a length of the sole part in the direction of the axis of the pedal shaft.

18. An exercise bicycle comprising:
a bicycle frame;
a seat arranged above a middle part of the bicycle frame;
a handle bar arranged above a front part of the bicycle frame;
a middle axle arranged below the middle part of the bicycle frame;
a pair of pedal cranks respectively fixedly connected to two ends of the middle axle; and two pedals respectively connected to the pair of pedal cranks;
wherein the middle axle is configured to include an eccentric wheel disposed on a straight shaft, the eccentric wheel is fixedly connected with the straight shaft; a guide rod is provided, the eccentric wheel is rotationally connected with a first end of the guide rod, a second end of the guide rod is in slip connection with a swing block articulated to the bicycle frame; and a position of the seat is fixed relatively to that of the guide rod.

19. The exercise bicycle according to claim 18, wherein the handle bar is connected to the guide rod.

20. The exercise bicycle according to claim 18, wherein each of the pedals comprise a sole part, an instep part, a supporting frame and a pedal shaft, wherein a first end of the sole part is connected with a lower end of the supporting frame; a second end of the instep part is connected with an upper end of the supporting frame; the instep part and the sole part are positioned at the same side of the supporting frame; the pedal shaft is connected to the supporting frame at a position between the sole part and the instep part, the pedal shaft is positioned on the supporting frame at a side opposite to the sole part and the instep part; in a state that the sole part is under the instep part, an axis of the pedal shaft is positioned above a center of gravity of the mechanism formed by connecting the supporting frame, the instep part and the sole part; the instep part has a length in a direction of the axis of the pedal shaft less than a length of the sole part in the direction of the axis of the pedal shaft.

* * * * *